(12) United States Patent
Shrivastava et al.

(10) Patent No.: US 11,178,702 B2
(45) Date of Patent: Nov. 16, 2021

(54) METHOD AND UE FOR PROVIDING LOSSLESS RACH PROCEDURE IN WIRELESS COMMUNICATION NETWORK

(71) Applicant: SAMSUNG ELECTRONICS CO., LTD., Suwon-si (KR)

(72) Inventors: Vinay Kumar Shrivastava, Karnataka (IN); Avijit Manna, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 110 days.

(21) Appl. No.: 16/668,800

(22) Filed: Oct. 30, 2019

(65) Prior Publication Data

US 2020/0154487 A1    May 14, 2020

(30) Foreign Application Priority Data

Oct. 30, 2018  (IN) ........................... P201841040995
Oct. 28, 2019  (IN) .............................. 201841040995

(51) Int. Cl.
| | | |
|---|---|---|
| *H04W 74/08* | (2009.01) | |
| *H04W 74/02* | (2009.01) | |
| *H04W 80/02* | (2009.01) | |
| *H04W 76/11* | (2018.01) | |
| *H04W 28/02* | (2009.01) | |
| *H04W 76/27* | (2018.01) | |
| *H04W 72/14* | (2009.01) | |

(52) U.S. Cl.
CPC ... *H04W 74/0833* (2013.01); *H04W 28/0278* (2013.01); *H04W 72/14* (2013.01); *H04W 74/02* (2013.01); *H04W 76/11* (2018.02); *H04W 76/27* (2018.02); *H04W 80/02* (2013.01)

(58) Field of Classification Search
CPC . H04W 74/0833; H04W 74/02; H04W 80/02; H04W 76/11; H04W 28/0278; H04W 76/27; H04W 72/14; H04W 28/065
See application file for complete search history.

(56) References Cited

U.S. PATENT DOCUMENTS

| 2019/0174575 A1* | 6/2019 | Shah ..................... H04L 1/1671 |
| 2019/0230667 A1* | 7/2019 | Loehr ................... H04L 1/0078 |
| 2020/0107370 A1* | 4/2020 | Wei .................. H04W 74/0833 |

* cited by examiner

*Primary Examiner* — Shailendra Kumar
(74) *Attorney, Agent, or Firm* — F. Chau & Associates, LLC

(57) ABSTRACT

A lossless Random Access Channel (RACH) procedure is described for a wireless communication network. The method includes determining whether size of an uplink (UL) grant is less than size of a Medium Access Control (MAC) layer protocol data unit (PDU) of a Msg3. In response to determining that the size of the UL grant is less than the size of the MAC PDU of the Msg3 performing one of: rebuilding the MAC PDU of the Msg3 using one or more MAC Sub PDUs (SDUs) based on the UL grant and transmits a rebuilt MAC PDU of the Msg3; initiating new RACH procedure; and updating one or more MAC CE in the Msg3. In response to determining that the size of the UL grant is not less than the size of the MAC PDU of the Msg3, updating the one or more MAC CE in the MAC PDU of the Msg3 based on values of the UL grant and transmits the updated MAC PDU of the Msg3.

18 Claims, 14 Drawing Sheets

METHOD AND UE FOR PROVIDING LOSSLESS RACH PROCEDURE IN WIRELESS COMMUNICATION NETWORK

CROSS REFERENCES

This application claims priority to, and the benefit of, Indian Provisional Application Serial No. 201841040995 filed on Oct. 30, 2018 and Indian Application No. 201841040995 filed on Oct. 28, 2019. The entire contents of the foregoing applications are hereby incorporated by reference for all purposes.

FIELD OF INVENTION

Embodiments of the present disclosure relate to wireless communication, and more particularly, to a method and a user equipment (UE) for providing a lossless Random Access Channel (RACH) procedure in wireless communication networks.

BACKGROUND

Wireless devices such as tablet computers and mobile phones use wireless communication networks to transmit information. Connection to the best network available allows for improved performance. Therefore, wireless devices may dynamically connect to different networks as needed for the best connection to a 5G network.

Various procedures enable a wireless device to connect to a network, including the Random Access Channel (RACH) procedure. During the RACH procedure, there may be a loss in connection content. Therefore, there is a need in the art for a lossless Random Access Channel (RACH) procedure in a wireless communication network SUMMARY Embodiments of the present disclosure provide a lossless Random Access Channel (RACH) procedure in a wireless communication network. The method includes determining, by a user equipment UE, that a size of a uplink (UL) grant is less than a size of a Medium Access Control (MAC) layer protocol data unit (PDU) of a Msg3 in a Msg3 buffer, where the Msg3 buffer comprises values of the at least one of MAC control elements (CE) of the MAC PDU and MAC Sub PDUs (MAC SDU) of the Msg3. Further, in response to determining that the size of the UL grant is less than the size of the MAC PDU of the Msg3 in the Msg3 buffer, the method includes performing by the UE, at least one of: rebuilding the MAC PDU of the Msg3 using the MAC SDUs from the Msg3 buffer based on the UL grant, and transmitting the rebuilt MAC PDU of the Msg3; initiating a new RACH procedure based on the determination; and updating at least one MAC Control Element (MAC CE) in the Msg3. Further, in response to determining that the size of the UL grant is not less than the size of the MAC PDU of the Msg3 in the Msg3 buffer, the method includes updating, by the UE, the at least one MAC Control Element (MAC CE) in the MAC PDU of the Msg3 based on values of the UL grant and transmitting the updated MAC PDU of the Msg3.

In an embodiment, the method includes determining, by the UE, whether the size of the UL grant is less than the size of the Msg3 in the Msg3 buffer includes determining, by the UE, whether the size of the UL grant is equal to the size of the MAC PDU of the Msg3 in the Msg3 buffer during a transition from a contention based random access (CBRA) to a content free random access (CFRA) in the wireless communication network, where the size of the MAC PDU of the Msg3 is formed during the CBRA operation and the UL grant is associated with the CFRA operation. The method also includes accommodating, by the UE, the at least one MAC SDU formed during the CBRA operation in the MAC PDU of the Msg3 and determining, by the UE, whether the size of the UL grant is less than the size of the MAC PDU of the Msg3 in the Msg3 buffer after accommodating the at least one MAC SDU in the MAC PDU of the Msg3.

In an embodiment, the method includes rebuilding the MAC PDU of the Msg3 using the MAC SDUs from the Msg3 buffer based on the UL grant includes receiving, by the UE, the MAC PDU of the Msg3 from the Msg3 buffer. The method also includes rebuilding, by the UE, the MAC PDU of the Msg3 based on the size of the UL grant using the at least one MAC SDU of the plurality of MAC SDUs, where the at least one MAC SDU is selected based on a priority. Further, the method also includes updating, by the UE, the at least one MAC CE of the rebuilt MAC PDU of the Msg3 based on a UE condition; and storing, by the UE, the remaining MAC SDUs of the plurality of MAC SDUs which are not accommodated in the UL grant for future UL grant.

In an embodiment, the method further includes transmitting, by the UE, the remaining MAC SDU of the plurality of MAC SDU based on a priority in the future UL grant.

In an embodiment, rebuilding the MAC PDU of the Msg3 using the MAC SDUs from the Msg3 buffer based on the UL grant includes receiving, by the UE, the MAC PDU of the Msg3 from the Msg3 buffer. The method also includes rebuilding, by the UE, the MAC PDU of the Msg3 based on the size of the UL grant using the at least one MAC SDU of the plurality of MAC SDU based on a priority. Further, the method also includes updating, by the UE, the at least one MAC CE based on a UE condition; and indicating, by the UE, a failure to a Radio link control (RLC) layer for the remaining MAC SDU of the plurality of MAC SDU which are not accommodated in the UL grant.

In an embodiment, the method further includes transmitting, by the UE, the remaining MAC SDU of the plurality of MAC SDUs in a future UL grant and determining, by the UE, the failure indication is provided for a Radio link control (RLC) layer status PDU. The method also includes triggering, by the UE, a transmission of a new Radio link control (RLC) status PDU.

In an embodiment, the method includes rebuilding the MAC PDU of the Msg3 using the MAC SDUs from the Msg3 buffer based on the UL grant includes receiving, by the UE, the MAC PDU of the Msg3 from the Msg3 buffer and rebuilding, by the UE, the MAC PDU of the Msg3 based on the size of the UL grant using the at least one MAC SDU of the plurality of MAC SDUs based on a priority. Further, the method also includes indicating, by the UE, a failure to a Radio link control (RLC) layer for the remaining MAC SDU of the plurality of MAC SDU which is not accommodated in the UL grant.

In an embodiment, the method further includes considering, by the UE, the failure to the RLC layer is a Radio link control (RLC) NAK (non-acknowledgement) message and transmitting, by the UE, the remaining MAC SDUs of the plurality of MAC SDUs in a future UL grant. The method also includes determining, by the UE, the failure indication is provided for a RLC layer status PDU; and triggering, by the UE, a transmission of a new RLC status PDU.

In an embodiment, the method includes rebuilding the MAC PDU of the Msg3 using the MAC SDUs from the Msg3 buffer based on the UL grant includes receiving, by the UE, the MAC PDU of the Msg3 from the Msg3 buffer and updating, by the UE, the at least one MAC CE based on a UE condition. Further, the method also includes determining, by the UE, a priority order of the plurality of MAC SDUs and eliminating, by the UE, the at least one MAC SDU of the plurality of MAC SDUs with low priority until the size of the MAC PDU of the Msg3 matches the size of the UL grant associated with the CFRA operation. The method also includes rebuilding, by the UE, the MAC PDU of the Msg3 using the remaining MAC SDUs of the plurality of MAC SDUs.

In an embodiment, the method includes rebuilding the MAC PDU of the Msg3 using the MAC SDUs from the Msg3 buffer based on the UL grant includes indicating, by the UE, a failure to a Radio Resource Control (RRC) for the at least one MAC SDU of the plurality of MAC SDU corresponding to the RRC and retransmitting, by the UE, the at least one MAC SDU which are indicated as failure by the UE. Further, the method also includes rebuilding, by the UE, the MAC PDU of the Msg3 based on the UL grant using the at least one MAC SDU of the plurality of MAC SDU.

In an embodiment, the method includes rebuilding the MAC PDU of the Msg3 using the MAC SDUs from the Msg3 buffer based on the UL grant includes receiving, by the UE, the MAC PDU of the Msg3 from the Msg3 buffer and updating, by the UE, the at least one MAC CE based on a UE condition. Further, the method also includes rebuilding, by the UE, the MAC PDU of the Msg3 by discarding a cell radio network temporary identifier (CRNTI) MAC CE.

In an embodiment, the method includes rebuilding the MAC PDU of the Msg3 using the MAC SDUs from the Msg3 buffer based on the UL grant includes receiving, by the UE, the MAC PDU of the Msg3 from the Msg3 buffer and determining, by the UE, the plurality of MAC SDU from the MAC PDU of the Msg3. Further, the method also includes determining, by the UE, a priority associated with the plurality of MAC SDUs based on a rule for CFRA grants and determining, by the UE, whether a space is available in the UL grant. The method also includes rebuilding, by the UE, the MAC PDU of the Msg3 by prioritizing new MAC SDUs based on the rule for new CFRA grants, in response to determining that the space is available in the UL grant; and rebuilding, by the UE, the MAC PDU of the Msg3 by prioritizing the remaining MAC SDUs of the plurality of MAC SDUs based on the rule for CFRA grants for future grants, in response to determining that the space is not available in the UL grant.

In an embodiment, the method includes updating the at least one MAC CE in the Msg3 includes determining, by the UE, the at least one MAC CE in the Msg3 from the Msg3 buffer and initiating, by the UE, a trigger for the at least one MAC CE in the Msg3 from the Msg3 buffer. The method also includes determining, by the UE, at least one new MAC CE based on the trigger; and updating, by the UE, the at least one MAC CE by incorporating the determined at least one new MAC CE.

In an embodiment, the method includes updating the at least one MAC CE in the Msg3 includes receiving, by the UE, the at least one new MAC CE from the Msg3 in the Msg3 buffer and determining, by the UE, a current status of a content of the at least one MAC CE. The method also includes determining, by the UE, the at least one MAC CE which are non-applicable based on the current status of the content of the at least one MAC CE and discarding, by the UE, the at least one MAC CE which are determined as non-applicable. Further, the method also includes updating, by the UE, the content of the at least one MAC CE based on the current status of the at least one MAC CE.

In an embodiment, the method includes initiating the new RACH procedure accordingly includes ignoring, by the UE, the UL grant associated with the CFRA operation; and initiating, by the UE, a RACH retransmission procedure by selecting a new RACH transmission resource.

In an embodiment, the method includes initiating the new RACH procedure accordingly includes aborting, by the UE, the RACH procedure and indicating, by the UE, a RACH failure to a Radio Resource Control (RRC) layer. Further, the method also includes receiving, by the UE, a retransmission message from the RRC layer, and initiating, by the UE, a new RACH procedure.

One or more embodiments of the present disclosure also provide a user equipment UE for providing lossless Random Access Channel (RACH) procedure in a wireless communication network. The UE includes a memory 140 and a processor 160 coupled to the memory 140. The processor 160 is configured to determine that a size of a uplink (UL) grant is less than a size of a Medium Access Control (MAC) layer protocol data unit (PDU) of a Msg3 in a Msg3 buffer, where the Msg3 buffer comprises values of the MAC PDU and MAC Sub PDUs (MAC SDU) of the Msg3. Further, in response to determining that the size of the UL grant is less than the size of the MAC PDU of the Msg3 in the Msg3 buffer, the processor 160 is configured to perform one of rebuild the MAC PDU of the Msg3 using the MAC SDUs from the Msg3 buffer based on the UL grant, and transmit the rebuilt MAC PDU of the Msg3; initiate a new RACH procedure based on the determination; and update at least one MAC Control Element (MAC CE) in the Msg3. Further, in response to determining that the size of the UL grant is not less than the size of the MAC PDU of the Msg3 in the Msg3 buffer, the processor 160 is configured to update the at least one MAC Control Element (MAC CE) in the MAC PDU of the Msg3 based on values of the UL grant and transmit the updated MAC PDU of the Msg3.

In an embodiment, a method of a wireless communication includes a UE transmitting a RACH preamble to a base station; receiving a random access response (RAR) message in response to the RACH preamble, wherein the RAR message includes an UL grant; determining that a size of the UL grant is less than a size of a MAC PDU in a Physical Uplink Shared Channel (PUSCH) buffer, wherein the PUSCH buffer comprises the MAC PDU and a plurality of MAC SDUs; and transmitting a PUSCH message based on the determination.

In some cases, the UE rebuilds the MAC PDU using the MAC SDUs based on the UL grant, where the PUSCH message comprises the rebuilt MAC PDU. In some cases, the UE initiates a new Random Access Channel (RACH) procedure based on the determination; and receives a new UL grant based on the new RACH procedure, wherein the PUSCH message is based on the new UL grant. In some cases, the UE updates at least one MAC Control Element (MAC CE) based on the determination, wherein the PUSCH message is based on the updated MAC CE.

These and other aspects of One or more embodiments of the present disclosure will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of One or more embodiments of the present disclosure without departing from the spirit thereof, and One or more embodiments of the present disclosure include all such modifications.

BRIEF DESCRIPTION OF FIGURES

The present disclosure is illustrated in the accompanying drawings, throughout which like reference letters indicate corresponding parts in the various figures. One or more embodiments of the present disclosure will be better understood from the following description with reference to the drawings, in which:

FIG. 1A illustrates beam formation and a Random Access Channel (RACH) procedure at a 5G wireless network, according to the prior art;

FIG. 4 illustrates the transmitting of the MAC PDU of the Msg3 after storing the remaining MAC SDUs which are not accommodated in the UL grant of the CFRA, according to an embodiment as disclosed herein;

FIG. 5 illustrates the transmitting of the MAC PDU of the Msg3 after indicating the failure to a Radio link control (RLC) layer for the remaining MAC SDUs, which are not accommodated in the UL grant, according to an embodiment as disclosed herein;

FIG. 6 illustrates the transmitting of the MAC PDU of the Msg3 after indicating the failure to a Radio link control (RLC) layer for the remaining MAC SDUs which are not accommodated in the UL, grant, according to an embodiment as disclosed herein;

FIG. 7 illustrates the transmitting the MAC PDU of the Msg3, according to an embodiment as disclosed herein;

FIG. 8 illustrates the transmitting the rebuilt MAC PDU of the Msg3, according to an embodiment as disclosed herein;

FIG. 9 illustrates the transmitting the rebuilt MAC PDU of the Msg3, according to an embodiment as disclosed herein;

FIG. 10 illustrates the transmitting of the rebuilt MAC PDU of the Msg3, according to an embodiment as disclosed herein;

DETAILED DESCRIPTION

The formation of a beam is an integrated feature in 5G wireless network. The beam symbolizes the transmission of signals in a particular direction. 5G signals are transmitted over a plurality of beams. User equipment UE may connect to the 5G wireless network over one of the beams of the plurality of beams available based on various parameters such as signal strength. Further, the connection over one of the beams is dynamic. For example, the UE selects the best beam of the plurality of beams and may switch from one beam to another beam of the plurality of beams to connect to the 5G wireless network (as shown in FIG. 1A).

Random Access Channel (RACH) procedure is a random procedure to access a channel. Once the UE is powered ON, the UE performs the RACH procedure to connect to the 5G wireless network. Connecting to the 5G network includes communicating messages. For example, a message may be a message 1 (Msg1) which includes preamble transmission, a message 2 (Msg2) which is a random access response, a message 3 (Msg3) which is a connection request and a message 4 (Msg4) which is a contention resolution. Since there may be a plurality of UEs sending the Msg1 to connect to the 5G wireless network, there may be a case of contention, and hence the contention is resolved by the Msg3 and the Msg4. There are two types of RACH procedures, which include a contention-based random access (CBRA) procedure and a contention-free random access (CFRA) procedure.

Figure 1B:
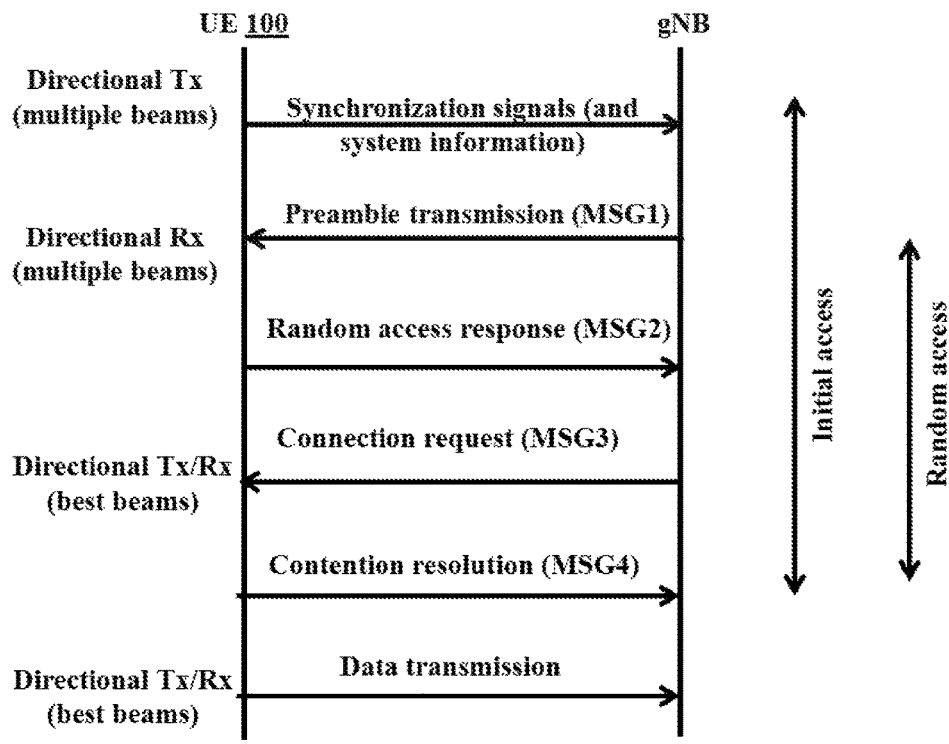
FIG. 1B illustrates a contention-based random access (CBRA) procedure and a contention-free random access (CFRA) procedure, according to the prior art.
Figure 1B:
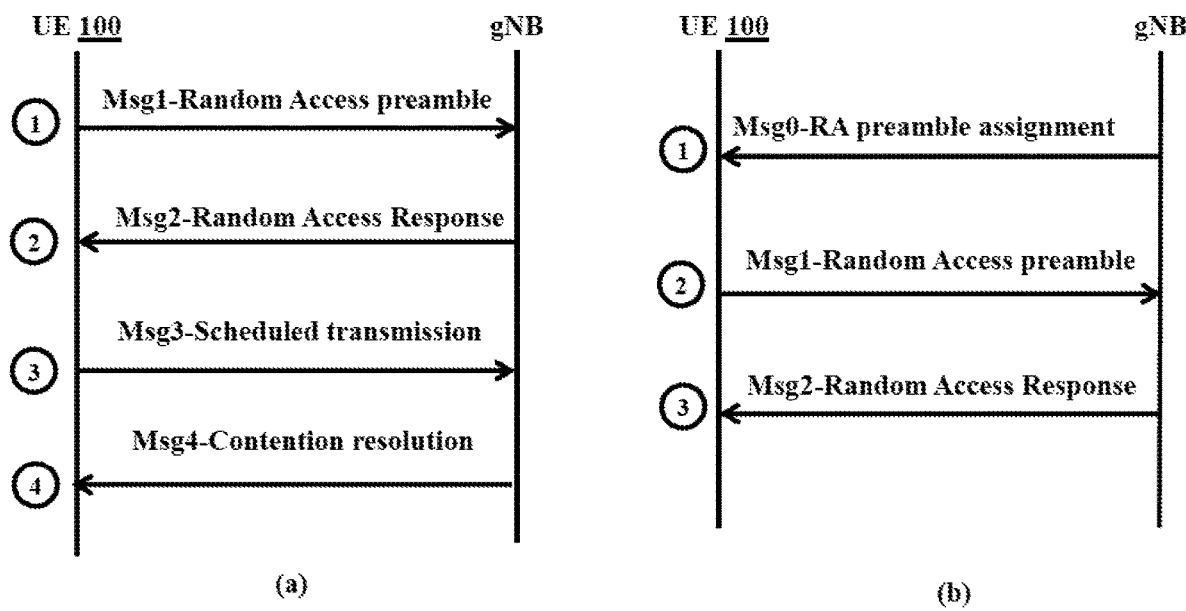

Consider that the plurality of UEs have initiated the RACH procedure with a gNodeB of the 5G wireless network, and hence there is the contention between the plurality of UEs to connect to the beam of the 5G wireless network. Referring to FIG. 1B (a), the contention-based random access (CBRA) procedure includes the UE at step 1, transmitting the Msg1 which is the random access preamble to the gNodeB of the 5G wireless network. At step 2, the gNodeB responds by sending the Msg2 which is the random access response to the UE. Further, at step 3, the UE sends the Msg3, which includes identifier parameters associated with the UE to the gNodeB, to enable the gNodeB to select the at least one UE of the plurality of UEs. Further, at step 4, the gNodeB selects at least one UE of the plurality of UEs and resolves the contention between the plurality of UEs. The gNodeB then sends the Msg4 indicating the identifier parameters associated with the UE which is selected by the gNodeB.

Referring to the FIG. 1B (b), at step 1, the gNodeB sends a Msg0, which is a random access preamble assignment indicating a dedicated preamble assigned to the UE by the gNodeB. Since there is no contention for the preamble provided by the gNodeB, the RACH procedure is called the contention-free random access (CFRA) procedure. Further at step 2, the UE transmits the Msg1 to the gNodeB of the 5G wireless network, and at step 3, the gNodeB responds by sending the Msg2, and the RACH procedure is completed.

Consider a handover scenario where the UE is configured with CFRA resources, but during the random access resource selection, none of the signal strength of beams (SSBs) having a configured CFRA resource possesses enough signal strength above a selected threshold. Therefore, the UE cannot pursue the CFRA procedure leading to the UE to fall back to the CBRA procedure. However, during the CBRA procedure, the contention resolution may be unsuccessful due to a contention resolution timer expiry or mismatching in the Msg4 received (i.e. another UE wins the contention for the RACH). When there is the failure of the contention resolution, the UE starts with the random access resource selection procedure again and determines the signal strength of the beams for performing the CFRA procedure. Further, on determining that the beams possess the signal strength above the selection threshold the UE switches to the CFRA procedure. Due to the switching between the CBRA and the CFRA procedures the UE may receive, in a random access response (Msg2), an uplink (UL) grant for the CFRA procedure. The uplink (UL) grant for the CFRA procedure may not match a size of a Medium Access Control (MAC) layer protocol data unit (PDU) stored in a Msg3 buffer. Since the 5G wireless network is not aware of whether the UE applied or attempted the CBRA procedure before the CFRA procedure, the 5G wireless network may not be able to know which of the UL grant sizes may be selected to avoid an issue with different grant sizes from the MAC PDU in the Msg3 buffer.

Consider another scenario where the UL grant is smaller than the size of the MAC PDU in the Msg3 buffer in a plurality of MAC Sub PDUs (MAC SDU), which are included in the Msg3 PDU may be discarded. The plurality of MAC SDUs may include unrecoverable critical elements such as a Radio Resource Control (RRC) reconfiguration complete message, a Radio link control (RLC) Status PDU, or a Packet Data Convergence Protocol (PDCP) Status PDU. Other unrecoverable critical elements may include MAC Control Elements such as power headroom reporting (PHR), buffer status report (BSR) etc. Further, Radio link control (RLC) data PDUs are also not transmitted or are delayed due to a no acknowledgment (NO ACK/NACK).

Since the gNodeB is not aware of a previous CBRA procedure and a potential Msg3 size, a partial or complete loss of previous Msg3 contents is unavoidable with the existing method of rebuilding the Msg3 during the CFRA. Further, there are also issues related to an implementation related to priority of the different contents of the previous Msg3 being inherited into the rebuilt Msg3 while rebuilding the Msg3.

Another issue which is caused during the rebuilding of the Msg3, is ordering or arrangement of the at least one MAC SDU of the plurality of MAC SDUs without consideration of priorities. For example, some of the MAC CEs have higher priority but are placed after the at least one MAC SDU along with other lower priority MAC CEs. Therefore, the implementation issues related to prioritization for the Msg3 while rebuilding and for all subsequent MAC SDUs needs to be addressed.

The above information is presented as background information only to help the reader to understand the present disclosure. Applicants have made no determination and make no assertion as to whether any of the above might be applicable as prior art with regard to the present application.

One or more embodiments of the present disclosure provide a lossless Random Access Channel (RACH) procedure in a wireless communication network. Embodiments herein determine that a size of an uplink (UL) grant is less than a size of a Medium Access Control (MAC) layer protocol data unit (PDU) of a Msg3 in a Msg3 buffer.

One or more embodiments of the present disclosure rebuild the MAC PDU of the Msg3 using MAC SDUs or MAC sub-PDUs from the Msg3 buffer based on the UL grant. Additionally, the embodiments transmit the rebuilt MAC PDU of the Msg3, when the size of the UL grant is less than the size of the MAC PDU of the Msg3 in the Msg3 buffer.

One or more embodiments of the present disclosure initiate a new RACH procedure. One or more embodiments of the present disclosure update at least one MAC Control Element (MAC CE) in the Msg3. One or more embodiments of the present disclosure update the at least one MAC CE in the MAC PDU of the based on values of the UL grant. Additionally, the embodiments transmit the updated MAC PDU of the Msg3, when the size of the UL grant is not less than the size of the MAC PDU of the Msg3 in the Msg3 buffer.

In another embodiment, a method of a wireless communication includes a UE transmitting a RACH preamble to a base station; receiving a random access response (RAR) message in response to the RACH preamble, wherein the RAR message includes an UL grant; determining that a size of the UL grant is less than a size of a MAC PDU in a Physical Uplink Shared Channel (PUSCH) buffer, wherein the PUSCH buffer comprises the MAC PDU and a plurality of MAC SDUs; and transmitting a PUSCH message based on the determination.

In some cases, the UE rebuilds the MAC PDU using the MAC SDUs based on the UL grant, where the PUSCH message comprises the rebuilt MAC PDU. In some cases, the UE initiates a new Random Access Channel (RACH) procedure based on the determination; and receives a new UL grant based on the new RACH procedure, wherein the PUSCH message is based on the new UL grant. In some cases, the UE updates at least one MAC Control Element (MAC CE) based on the determination, wherein the PUSCH message is based on the updated MAC CE.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments.

Herein, the term "or" as used herein, refers to a non-exclusive or, unless otherwise indicated. The examples used herein are intended merely to facilitate an understanding of ways in which One or more embodiments of the present disclosure can be practiced and to further enable those skilled in the art to practice One or more embodiments of the present disclosure. Accordingly, the examples should not be construed as limiting the scope of One or more embodiments of the present disclosure.

As is traditional in the field, embodiments may be described and illustrated in terms of blocks which carry out a described function or functions. These blocks, which may be referred to herein as units, engines, manager, modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, One or more embodiments of the present disclosure provide a lossless Random Access Channel (RACH) procedure in a wireless communication network. The lossless RACH procedure includes determining, by a user equipment UE, that a size of an uplink (UL) grant is less than a size of a Medium Access Control (MAC) layer protocol data unit (PDU) of a Msg3 in a Msg3 buffer. The Msg3 buffer comprises values of the MAC PDU and MAC Sub PDUs (MAC SDU) of the Msg3. Further, in response to determining that the size of the UL grant is less than the size of the MAC PDU of the Msg3 in the Msg3 buffer, the UE performs one of rebuilding the MAC PDU of the Msg3 using the MAC SDUs from the Msg3 buffer based on the UL grant and transmits the rebuilt MAC PDU of the Msg3, initiating a new RACH procedure based on the determination, and updating at least one MAC Control Element (MAC CE) in the Msg3. Further, in response to determining that the size of the UL grant is not less than the size of the MAC PDU of the Msg3 in the Msg3 buffer, the UE updates the at least one MAC Control Element (MAC CE) in the MAC PDU of the Msg3 based on values of the UL grant and transmits the updated MAC PDU of the Msg3.

Referring now to the drawings, and more particularly to FIGS. 1 through 14, where similar reference characters denote corresponding features consistently throughout the figures, there are shown preferred embodiments.

Figure 2:
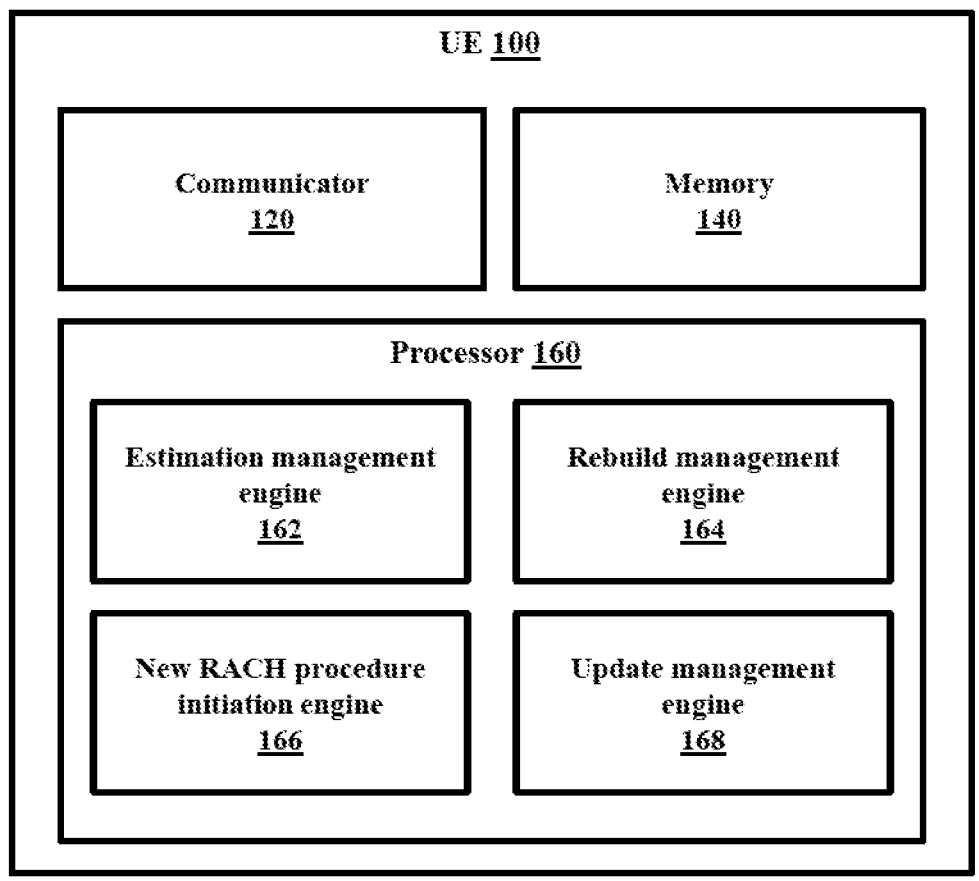
FIG. 2 is a block diagram of user equipment UE for providing lossless RACH procedure in a wireless communication network, according to an embodiment as disclosed herein.

FIG. 2 is a block diagram of the user equipment UE 100 for providing a lossless RACH procedure in a wireless communication network, according to an embodiment as disclosed herein.

Referring to FIG. 2, the UE can be, for example, a mobile phone, a smartphone, a Personal Digital Assistant (PDA), a tablet, or the like. In an embodiment, the UE can include a communicator 120, a memory 140, and a processor 160.

In an embodiment, the communicator 120 is configured to receive a Medium Access Control (MAC) layer protocol data unit (PDU) of a Msg3 from a Msg3 buffer. The Msg3 buffer includes values of the MAC PDU and MAC Sub PDUs (MAC SDU) of the Msg3. The communicator 120 is configured to transmit remaining MAC SDUs of a plurality of MAC SDU based on a priority in a future UL grant. The communicator 120 is also configured to retransmit the at least one MAC SDU, which are indicated as a failure by the UE. The communicator 120 is also configured to receive a retransmission message from the Radio Resource Control (RRC) layer.

In an embodiment, the memory 140 is configured to store the MAC SDUs of the plurality of MAC SDUs which are not accommodated in the UL grant for transmission as part of a future UL grant. The memory 140 can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 140 may, in some examples, be considered a non-transitory storage medium. The term "non-transitory" may indicate that the storage medium is not embodied in a carrier wave or a propagated signal. However, the term "non-transitory" should not be interpreted that the memory 140 is non-movable. In some examples, the memory 140 is configured to store larger amounts of information than the memory. In certain examples, a non-transitory storage medium may store data that can, over time, change (e.g., in Random Access Memory (RAM) or cache).

In an embodiment, the processor 160 includes estimation management engine 162, a rebuild management engine 164, a new RACH procedure initiation engine 166, and an update management engine 168.

The estimation management engine 162 is configured to determine whether the size of the UL grant is equal to the size of the MAC PDU of the Msg3 in the Msg3 buffer during a transition from contention-based random access (CBRA) to contention-free random access (CFRA) in the wireless communication network. The MAC PDU of the Msg3 is formed during the CBRA operation, and the UL grant is associated with the CFRA operation.

In another embodiment, the estimation management engine 162 does not add any other RLC PDU, other than an RRC message (i.e. signaling radio bearer (SRB) PDU), while composing the Msg3 during the CBRA procedure. The addition of the SRBPDU in the Msg3 eliminates the possibility of lesser UL grant during the CFRA procedure. Further, in a case of an unfilled grant of the CBRA procedure, the UE performs padding BSR or padding.

Further, the estimation management engine 162 is also configured to accommodate the at least one MAC SDU formed during the CBRA operation in the MAC PDU of the Msg3. Additionally, the estimation management engine 162 may determine whether the size of the UL grant is less than the size of the MAC PDU of the Msg3 in the Msg3 buffer, after accommodating the at least one MAC SDU in the MAC PDU of the Msg3.

The rebuild management engine 164 is configured to rebuild the MAC PDU of the Msg3 using the MAC SDUs from the Msg3 buffer, based on the UL grant when the size of the UL grant is less than the size of the MAC PDU of the Msg3 in the Msg3 buffer. The rebuild management engine 164 may rebuild the MAC PDU of the Msg3 in one of the seven procedures, which are explained in FIG. 4 to FIG. 10.

In response to determining that the size of the UL grant is not less than the size of the MAC PDU of the Msg3 in the Msg3 buffer, the rebuild management engine 164 is configured to rebuild the Msg3. Rebuilding the Msg3 is determined by creating space by discarding CRNTI MAC CE so that the rebuilt Msg3 fits exactly into the new CFRA UL grant size, prioritizing the MAC elements in the existing Msg3 buffer, or discarding one or more MAC SDUs starting from lowest priority so that space is created till the rebuilt Msg3 fits exactly into the new CFRA UL grant size. Additionally, rebuilding the Msg3 is determined by retaining or storing the at least one MAC SDUs which are not accommodated in the new CFRA UL grant for any future transmission or a fresh transmission from the RLC of the at least one MAC SDUs which are not accommodated in the new CFRAUL grant for any future transmission. Rebuilding the Msg3 is also determined by retransmission from the RLC of the at least one MAC SDUs which are not accommodated in the new CFRAUL grant for any future transmission, ignore the new CFRA UL grant and retry the RACH procedure from the MAC layer, or aborting the on-going RACH procedure indicating to a higher layer as failure to trigger message retransmission from the higher layers (e.g. RLC or RRC) which may initiate a new RACH procedure.

The new RACH procedure initiation engine 166 is configured to initiate a new RACH procedure when the size of the UL grant is less than the size of the MAC PDU of the Msg3 in the Msg3 buffer. The new RACH procedure initiation engine 166 may initiate the new RACH procedure, as explained in FIG. 13 to FIG. 14.

The update management engine 168 is configured to update at least one MAC Control Element (MAC CE) in the Msg3, when the size of the UL grant is less than the size of the MAC PDU of the Msg3 in the Msg3 buffer. The update management engine 168 may update the at least one MAC Control Element (MAC CE) in the Msg3, as explained in FIG. 11 to FIG. 12.

Further, the update management engine 168 is also configured to update the at least one MAC CE in the MAC PDU of the Msg3 based on values of the UL grant. The update is in response to determining that the size of the UL grant is not less than the size of the MAC PDU of the Msg3 in the Msg3 buffer.

In response to determining that the size of the UL grant is equal to the size of the MAC PDU of the Msg3 in the Msg3 buffer, the update management engine 168 may consider the MAC PDU of the Msg3 in the existing Msg3 buffer, discard a CRNTI MAC CE of the MAC PDU of the Msg3, remove the MAC CEs which are determined as stale/outdated/non-applicability, update the MAC CE based on the status of the UE, or consider change in the size of the MAC elements after updating the MAC CE. For example, the space used for the long BSR to the short BSR conversion can be accommodated in the space created by discarding the CRNTI MAC CE or other MAC CE. The space created for the short BSR to the long BSR conversion can be filled with padding header or bits. Embodiments of the present disclosure may also include the addition of new MAC CEs per the applicability, status and available space, or the addition of a padding header or bits to fill the remaining size, if available.

In another embodiment, a method is applicable to any other scenarios such as a switch from the CFRA procedure to the CBRA procedure, switch from the CBRA procedure to the CFRA procedure, a beam failure handling, a multi-carrier RACH mechanism, a NR-Wi-Fi, a NR-LTE, a NR-NR dual/multi-connectivity, radio link/synch failure, but is not limited thereto.

In yet another embodiment, a method is applicable to various radio access technologies such as LTE, NR, WiFi, LiFi, V2X, future generation technologies (6G and so on), etc.

In yet another embodiment, a method is applicable to bandwidth parts (BWPs) change, Subcarrier Spacing (SCS) change, frequency range 1 (FR1) to frequency range 2 (FR2) change and vice versa, wide beam to narrow beam change and vice versa during the RACH procedure.

Although FIG. 2 shows hardware elements of the UE 100, it is to be understood that other embodiments are not limited thereon. In other embodiments, the UE 100 may include a number of elements. Further, the labels or names of the elements are used only for illustrative purpose and does not limit the scope of the disclosure. One or more components can be combined together to perform the same or substantially similar function for providing a lossless RACH procedure in the wireless communication network.

Figure 3:
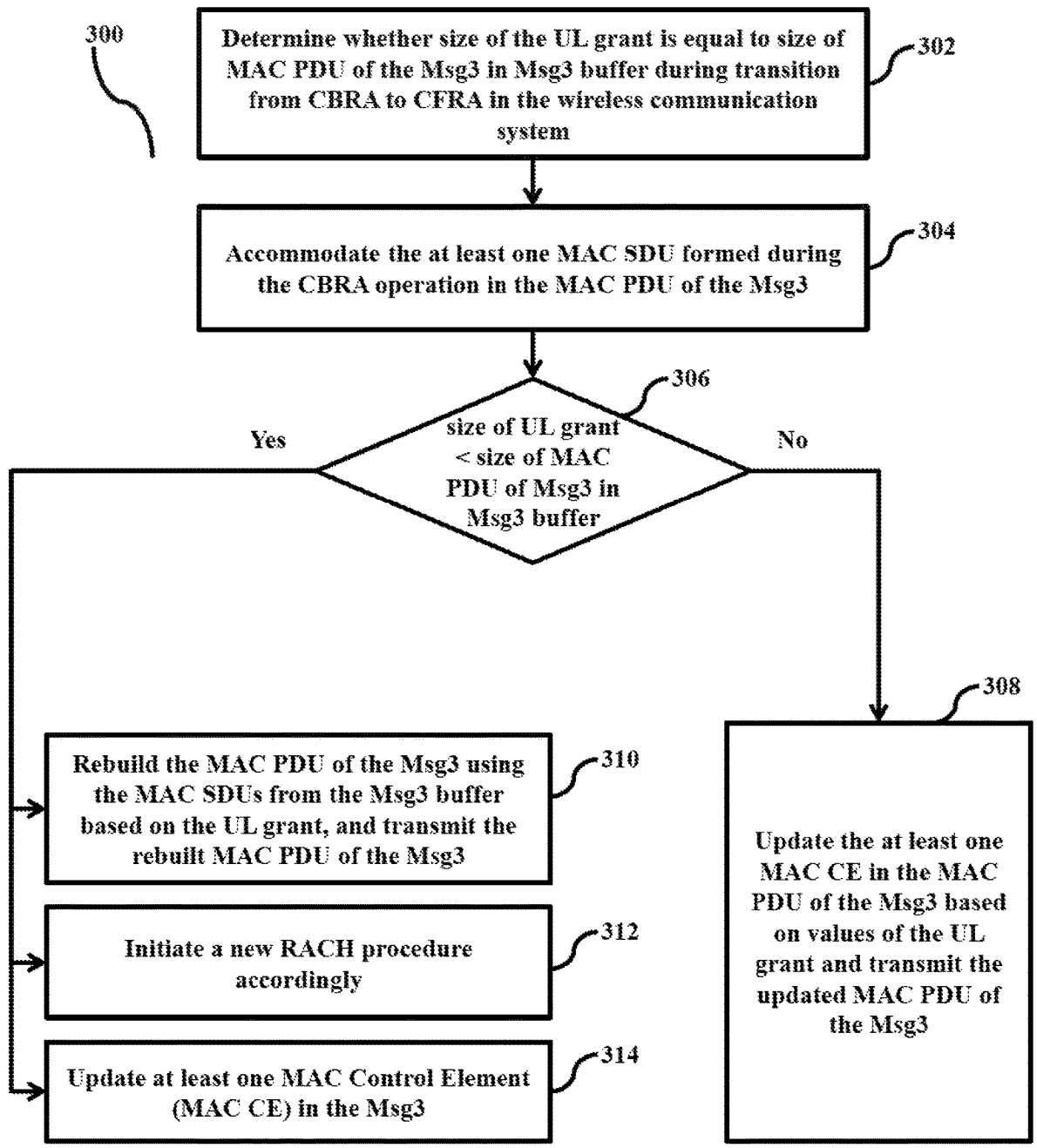
FIG. 3 is a flow chart illustrating a method for providing lossless RACH procedure in the wireless communication network, according to an embodiment as disclosed herein.

FIG. 3 is a flow chart 300 illustrating a lossless RACH procedure in the wireless communication network, according to an embodiment as disclosed herein.

Referring to FIG. 3, at step 302, the UE determines whether the size of the UL grant is equal to the size of MAC PDU of the Msg3 in the Msg3 buffer during the transition from the CBRA to the CFRA in the wireless communication network. For example, in the UE as illustrated in FIG. 2, the processor 160 can be configured to determine whether the size of the UL grant is equal to the size of MAC PDU of the Msg3 in the Msg3 buffer during the transition from the CBRA to the CFRA in the wireless communication network.

At step 304, the UE accommodates the at least one MAC SDU formed during the CBRA operation in the MAC PDU of the Msg3. For example, in the UE, as illustrated in FIG. 2, the processor 160 can be configured to accommodate the at least one MAC SDU formed during the CBRA operation in the MAC PDU of the Msg3.

At step 306, the UE determines whether the size of the UL grant is less than the size of the MAC PDU of the Msg3 in the Msg3 buffer. For example, in the UE, as illustrated in FIG. 2, the processor 160 can be configured to determine whether the size of the UL grant is less than the size of the MAC PDU of the Msg3 in the Msg3 buffer.

At step 308, the UE updates the at least one MAC CE in the MAC PDU of the Msg3 based on the values of the UL grant and transmit the updated MAC PDU of the Msg3. For example, in the UE, as illustrated in FIG. 2, the processor 160 can be configured to update the at least one MAC CE in the MAC PDU of the Msg3 based on the values of the UL grant and transmit the updated MAC PDU of the Msg3.

At step 310, the UE rebuilds the MAC PDU of the Msg3 using the MAC SDUs from the Msg3 buffer based on the UL grant, and transmit the rebuilt MAC PDU of the Msg3. For example, in the UE, as illustrated in FIG. 2, the processor 160 can be configured to rebuild the MAC PDU of the Msg3 using the MAC SDUs from the Msg3 buffer based on the UL grant and transmit the rebuilt MAC PDU of the Msg3.

At step 312, the UE initiates the new RACH procedure accordingly. For example, in the UE, as illustrated in FIG. 2, the processor 160 can be configured to initiate the new RACH procedure accordingly.

At step 314, the UE updates the at least one MAC Control Element (MAC CE) in the Msg3. For example, in the UE, as illustrated in FIG. 2, the processor 160 can be configured to update the at least one MAC Control Element (MAC CE) in the Msg3.

The various actions acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the disclosure.

Figure 4:
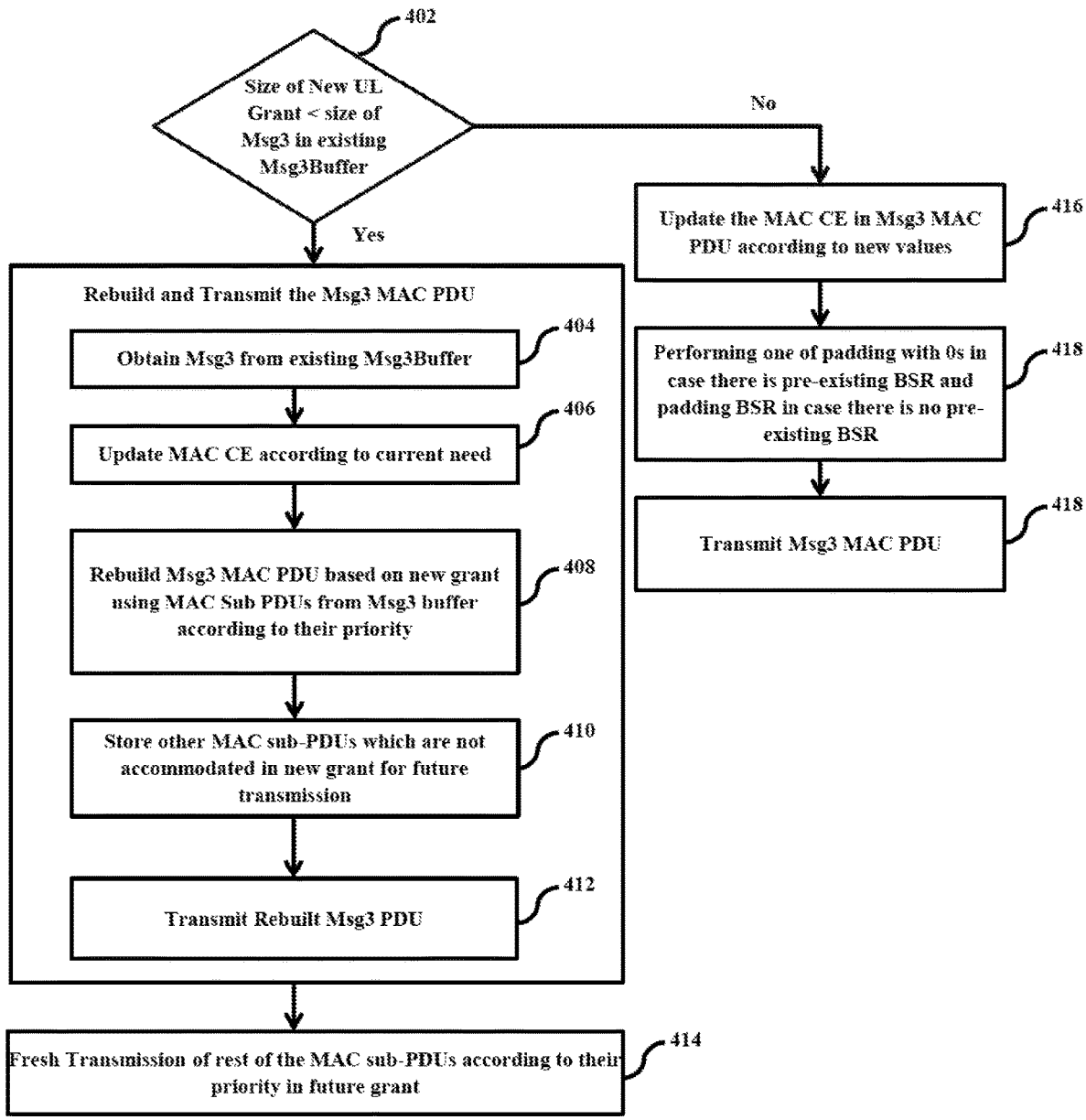
FIG. 4 is a flow chart illustrating a method for rebuilding the MAC PDU of the Msg3 using the MAC SDUs from the Msg3 buffer. Additionally.

FIG. 4 is a flow chart illustrating a method for rebuilding the MAC PDU of the Msg3 using the MAC SDUs from the Msg3 buffer. Additionally, FIG. 4 illustrates a method for transmitting the MAC PDU of the Msg3 after storing the remaining MAC SDUs which are not accommodated in the UL grant of the CFRA, according to an embodiment as disclosed herein.

Referring to FIG. 4, at step 402, consider that the UE determines that the size of the UL grant received during the CFRA is less than the size of the MAC PDU of the Msg3, which was composed during the CBRA. Therefore, the MAC PDU of the Msg3 composed during the CBRA may be rebuilt so that the MAC SDUs, which include the critical elements, may be accommodated in Msg3.

At step 404, the UE receives the Msg3 from the existing Msg3 buffer. At step 406, the UE determines that the MAC PDU of the Msg3 may be rebuilt. The rebuild is determined by the UL grant received during the CFRA procedure using the MAC SDUs from the MAC PDU of the Msg3 associated with the CBRA procedure. The MAC SDUs are considered based on a priority of the MAC SDUs while rebuilding the Msg3.

At step 406, the UE updates the MAC CEs associated with the MAC SDUs. The updated is determined by the CFRA procedure, as the existing MAC CEs contents may be associated with the MAC SDUs with respect to the previous CBRA procedure.

At step 408, the UE rebuilds the MAC PDU of the Msg3 based on the UL grant received during the CFRA procedure using the MAC SDUs from the MAC PDU of the Msg3 associated with the CBRA procedure. The MAC SDUs include the updated MAC CEs and are considered based on a priority of the MAC SDUs while rebuilding the Msg3.

Since the size of the UL grant received during the CFRA is less than the size of the MAC PDU of the Msg3, the UL grant is not capable of accommodating all the MAC SDUs from the MAC PDU of the Msg3. The size of the UL grant received during the CFRA is composed during the CBRA.

Therefore, at step 410, the UE stores the remaining MAC SDUs from the MAC PDU of the Msg3, which are not accommodated in the UL grant, in a new buffer at a MAC layer. The remaining MAC SDUs from the MAC PDU of the Msg3 are stored in a new buffer at a MAC layer so that the remaining MAC SDUs may be accommodated in a next UL grant which the wireless communication network allocates.

At step 412, the MAC PDU of the Msg3, which is rebuilt based on the UL grant received during the CFRA procedure, is transmitted by the UE.

Further, at step 414, the UE receives the next UL grant from the wireless communication network and forms another Msg3 comprising the remaining MAC SDUs based on the priority of the remaining MAC SDUs. The UE then transmits the Msg3. In some cases, the UE accommodates multiple MAC SDUs after updating the MAC CEs in the existing UL grant and future grants. The UE may accommodate multiple MAC SDUs after updating the MAC CEs so that the MAC SDUs comprising the MAC CEs associated with the previous CBRA procedure are utilized.

At step 402, consider that the UE determines that the size of the UL grant received during the CFRA is not less than the size of the MAC PDU of the Msg3, which was composed during the CBRA.

At step 416, the UE updates the MAC CEs associated with the MAC SDUs based on the CFRA procedure. Existing MAC CEs content may be associated with the MAC SDUs with respect to the previous CBRA procedure. Further, at step 418, the UE performs either padding with 0s in case there is a pre-existing BSR or padding buffer status report (BSR), in case there is no pre-existing BSR in the UI, grant received during the CFRA to fill in the extra space. At step 420, the UE transmits the MAC PDU of the Msg3 with updated MAC SDUs based on the UL grant received during the CFRA procedure.

Figure 5:
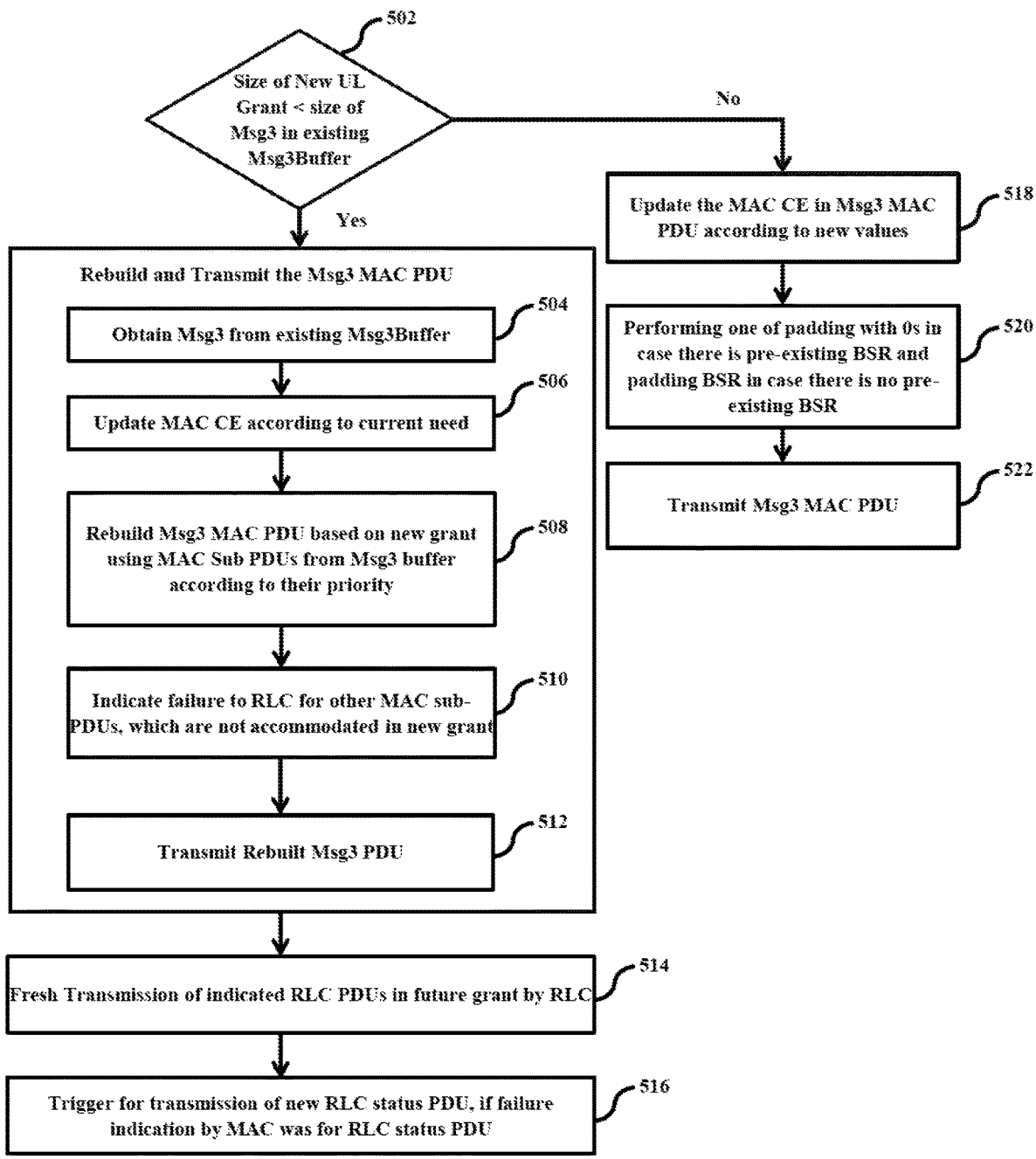
FIG. 5 is a flow chart illustrating a method for rebuilding the MAC PDU of the Msg3 using the MAC SDUs from the Msg3 buffer. Additionally.

FIG. 5 is a flow chart illustrating a method for rebuilding the MAC PDU of the Msg3 using the MAC SDUs from the Msg3 buffer. Additionally, FIG. 5 illustrates transmitting the MAC PDU of the Msg3 after indicating the failure to a Radio link control (RLC) layer for the remaining MAC SDUs, which are not accommodated in the UL grant, according to an embodiment as disclosed herein.

Referring to FIG. 5 in conjunction with FIG. 4, steps 402-408 to steps 416-418 in FIG. 4, and steps 502-508 to steps 518-522 in FIG. 5 are the same. Hence, repetitive descriptions are omitted.

The MAC SDUs are received by the MAC layer from a higher layer such as the Radio link control (RLC) layer. As the size of the UL grant is less than the size of the MAC PDU of the Msg3, the UL, grant is not capable of accommodating all the MAC SDUs from the MAC PDU of the Msg3. Therefore, at step 510, the UE indicates a failure to the RLC layer for the remaining MAC SDUs, which are not accommodated in the UL grant received during the CFRA procedure. Therefore, the RLC layer is informed that the remaining MAC SDUs have not been received by the MAC layer due to transmission failure.

At step 512, the MAC PDU of the Msg3, which is rebuilt based on the UL grant received during the CFRA procedure, is transmitted by the UE.

At step 514, the UE sends an indication to the RLC layer to retransmit the remaining MAC SDUs upon receiving a new UL grant from the wireless communication network. The remaining MAC SDUs are not accommodated in the previous UL grant. The UE then receives the remaining MAC SDUs, which are not accommodated in the previous UL grant, and accommodates the remaining MAC SDUs in the new UL grant.

Further, at step 516, the UE triggers for the transmission of a new RLC status PDU, if the failure indication by the MAC layer was for the RLC status PDU.

According to one embodiment of present disclosure, Segmentation at RLC is carried out when accommodating a complete RLC PDU in a new grant is not possible.

Figure 6:
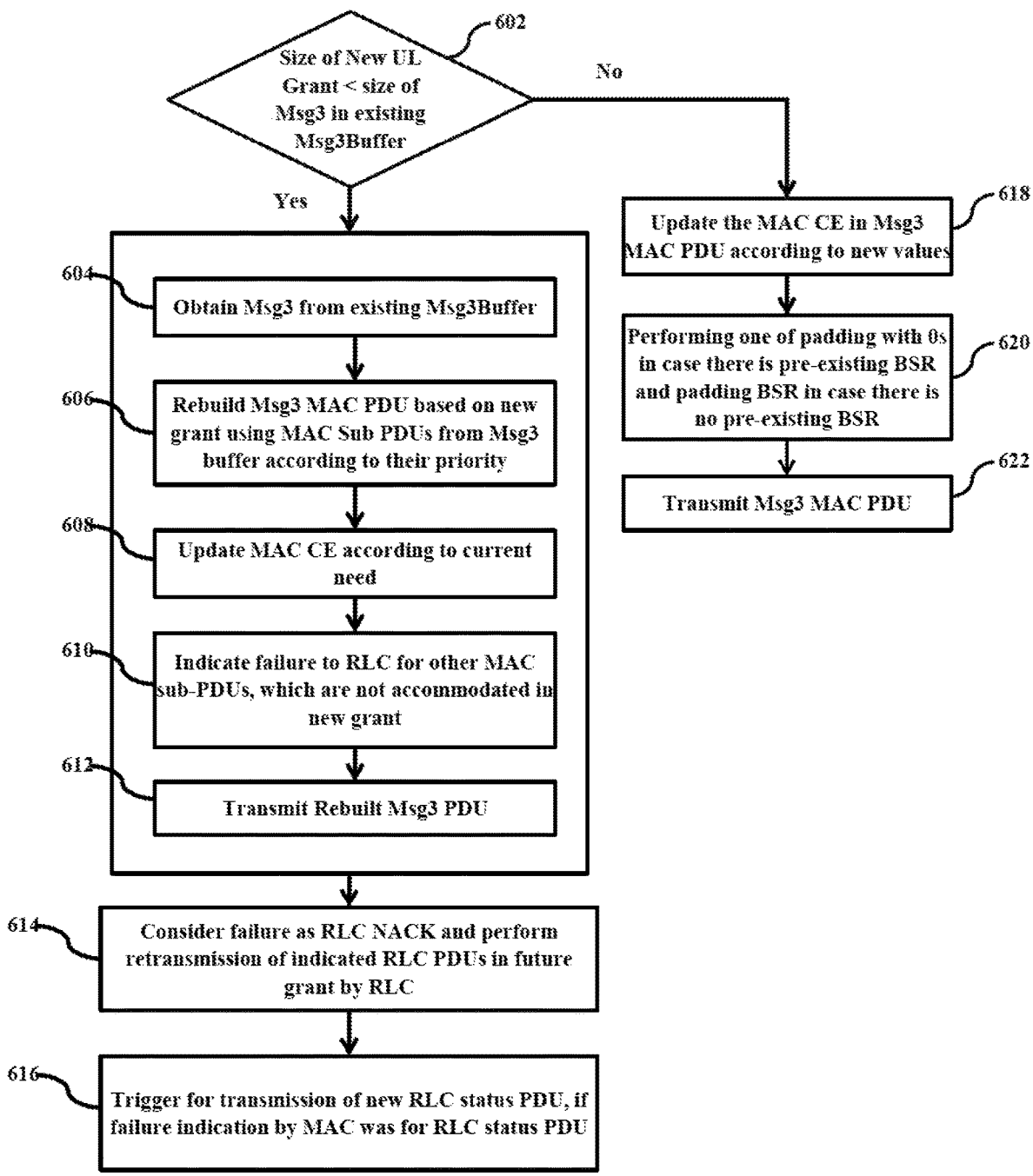
FIG. 6 is a flow chart illustrating a method for rebuilding the MAC PDU of the Msg3 using the MAC SDUs from the Msg3 buffer. Additionally.

FIG. 6 is a flow chart illustrating a method for rebuilding the MAC PDU of the Msg3 using the MAC SDUs from the Msg3 buffer. Additionally, FIG. 6 illustrates transmitting the MAC PDU of the Msg3 after indicating the failure to a Radio link control (RLC) layer for the remaining MAC SDUs. The remaining MAC SDUs are not accommodated in the UL grant, according to an embodiment as disclosed herein.

Referring to FIG. 6 in conjunction with FIG. 5, steps 502-512 to steps 518-522 in FIG. 5 and steps 602-612 to steps 616-618 in FIG. 6 are the same. Hence, repetitive descriptions are omitted.

At step 614, the UE on receiving the new UL grant considers the failure to the RLC layer is a Radio link control (RLC) NACK (non-acknowledgment) message and requests for the retransmission of the remaining MAC SDUs of the plurality of MAC SDUs from the RLC layer.

The RLC layer on receiving the failure indication from the UE retransmits the NACKed MAC SDUs and triggers an RLC status PDU. Further, the RLC layer transmits the NACKed MAC SDUs to the UE as part of the RLC status PDU.

At step 616, the UE receives the remaining MAC SDUs of the plurality of MAC SDUs and transmits the remaining MAC SDUs in the new UL grant. The remaining MAC SDUs were not accommodated in the previous UL grant FIG. 7 is a flow chart illustrating a method for rebuilding the MAC PDU of the Msg3 based on discarding low priority MAC SDUs and transmits the MAC PDU of the Msg3, according to an embodiment as disclosed herein.

Figure 7:
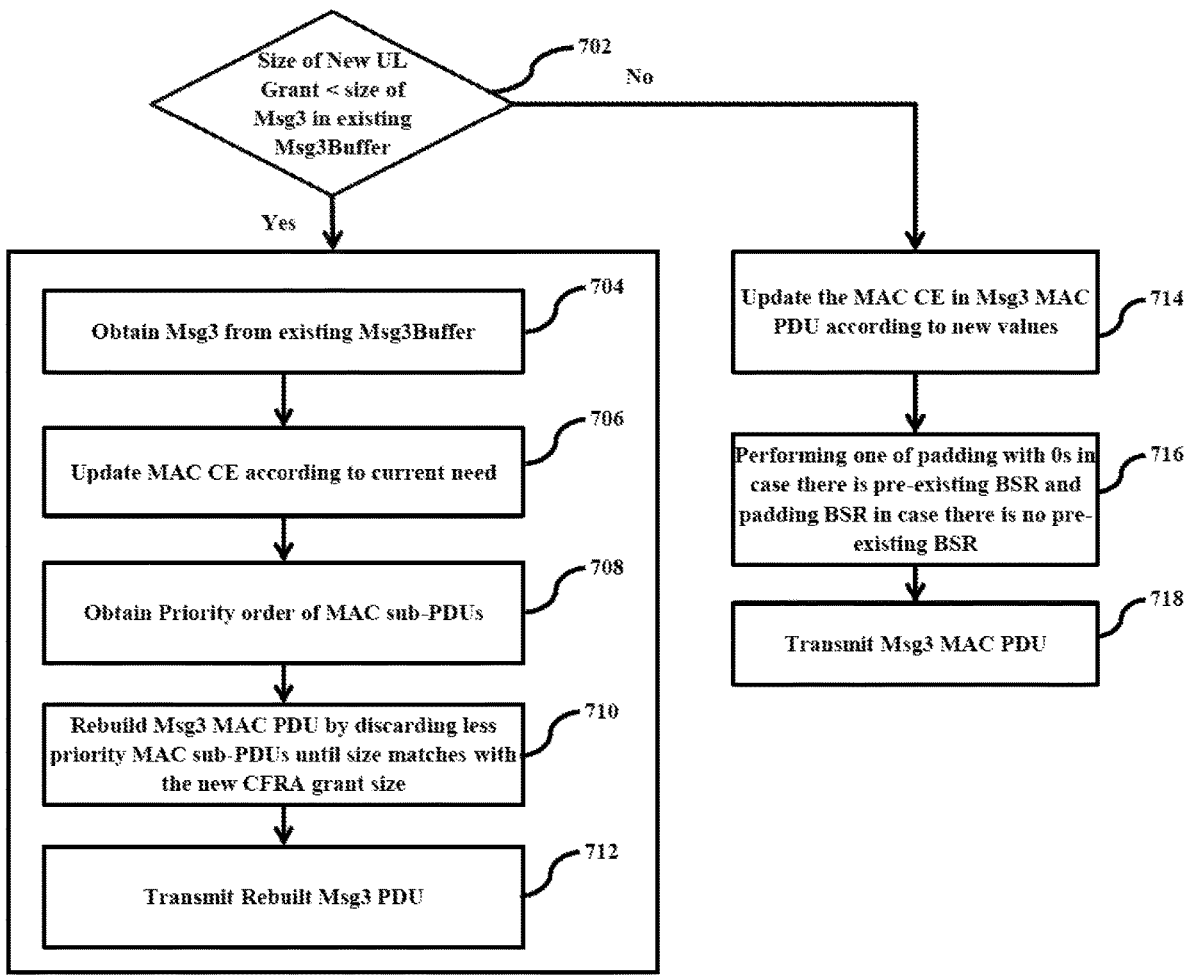
FIG. 7 is a flow chart illustrating a method for rebuilding the MAC PDU of the Msg3 based on discarding low priority MAC SDUs. Additionally.

Referring to FIG. 7, at step 702, the UE determines that the size of the UL grant received during the CFRA is less than the size of the MAC PDU of the Msg3, which was composed during the CBRA and hence the MAC PDU of the Msg3 may be rebuilt.

At step 704, the UE receives the Msg3 from the existing Msg3 buffer. At step 706, the UE updates the at least one MAC CE of the MAC PDU of the Msg3 based on the UE conditions. Further, at step 708, the UE determines the priority of the plurality of the MAC SDUs associated with the Msg3. At step 710, the UE eliminates the at least one MAC SDU of the plurality of MAC SDUs with the lowest priority, until the size of the MAC PDU of the Msg3 matches the size of the new UL grant associated with the CFRA operation and rebuilds the MAC PDU of the Msg3 using the remaining MAC SDUs of the plurality of MAC SDUs. At step 712, the UE transmits the rebuilt Msg3.

Further, steps 714 to 718 in FIG. 7 and steps 618 to 622 in FIG. 6 are the same. Hence, repetitive descriptions are omitted.

Figure 8:
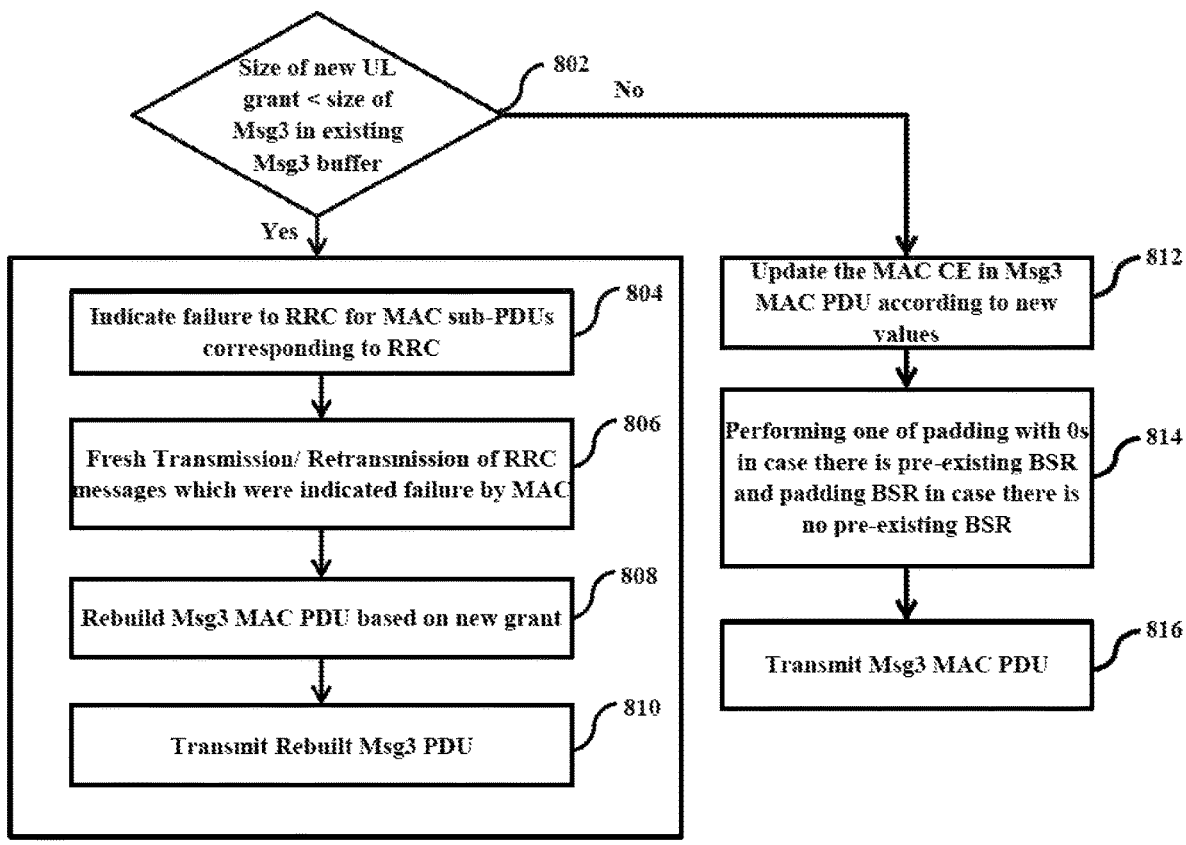
FIG. 8 is a flow chart illustrating a method for rebuilding the MAC PDU of the Msg3 using the RRC messages which were indicated failure by the MAC layer. Additionally.

FIG. 8 is a flow chart illustrating a method for rebuilding the MAC PDU of the Msg3 using the RRC messages, which were indicated failure by the MAC layer and transmits the rebuilt MAC PDU of the Msg3, according to an embodiment as disclosed herein.

Referring to FIG. 8 in conjunction with FIG. 5, steps 502, 518 to 522 in FIG. 5 and steps 802, 812-816 in FIG. 8 are the same. Hence, repetitive descriptions are omitted. At step 802, the UE determines whether the size of the UL grant received during the CFRA is less than the size of the MAC PDU of the Msg3, which was composed during the CBRA.

At step 804, the UE indicates a failure to the RRC layer for the MAC SDUs corresponding to the RRC layer. At step 806, the UE requests for fresh transmission or retransmission of the RRC messages, which were indicated as failure by the MAC layer. In response to the fresh transmission or retransmission of the RRC messages request received by the RRC layer, the RRC layer entity transmits the RRC messages corresponding to the RRC layer.

At step 808, the UE rebuilds the MAC PDU of the Msg3 based on the new UL grant of the CFRA procedure, and at step 810, the UE transmits the rebuilt MAC PDU of the Msg3.

Figure 9:
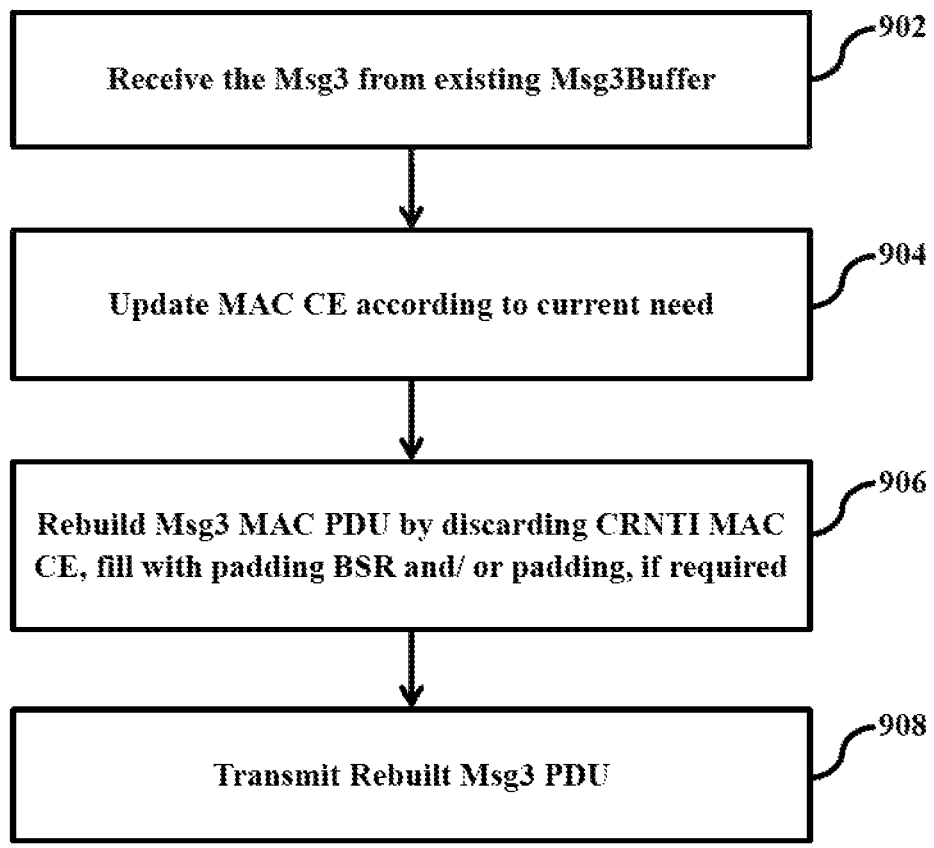
FIG. 9 is a flow chart illustrating a method for rebuilding the MAC PDU of the Msg3 by discarding a cell radio network temporary identifier (CRNTI) MAC CE. Additionally.

FIG. 9 is a flow chart illustrating a method for rebuilding the MAC PDU of the Msg3 by discarding a cell radio network temporary identifier (CRNTI) MAC CE and transmits the rebuilt MAC PDU of the Msg3, according to an embodiment as disclosed herein.

Referring to FIG. 9, at step 902, the UE receives the MAC PDU of the Msg3 from the Msg3 buffer. At step 904, the UE updates the at least one MAC CE based on the UE condition. At step 906, the UE rebuilds the MAC PDU of the Msg3 by discarding the cell radio network temporary identifier (CRNTI) MAC CE and filling by padding BSR or padding. The CRNTI MAC CE may be used for executing the CBRA procedure as the CRNTI MAC CE provides a UE ID to the wireless communication network. However, the CRNTI MAC CE is not required for performing the CFRA procedure and hence can be removed from the Msg3.

On discarding the CRNTI MAC CE, 6 bytes of space can be made available in the UL grant for accommodating the at least one MAC SDUs of the Msg3 and can also be filled by padding BSR or padding.

In another embodiment, a method of discarding the CRNTI MAC CE is applicable even when the size of the UL grant received during the CFRA is not less than the size of the MAC PDU of the Msg3. Further, the CRNTI MAC CE is retained while rebuilding the MAC PDU of the Msg3 from the new UL grant. The peer entity (e.g., Network or Test Equipment) ignores the CRNTI MAC CE during the CFRA procedure.

Figure 10:
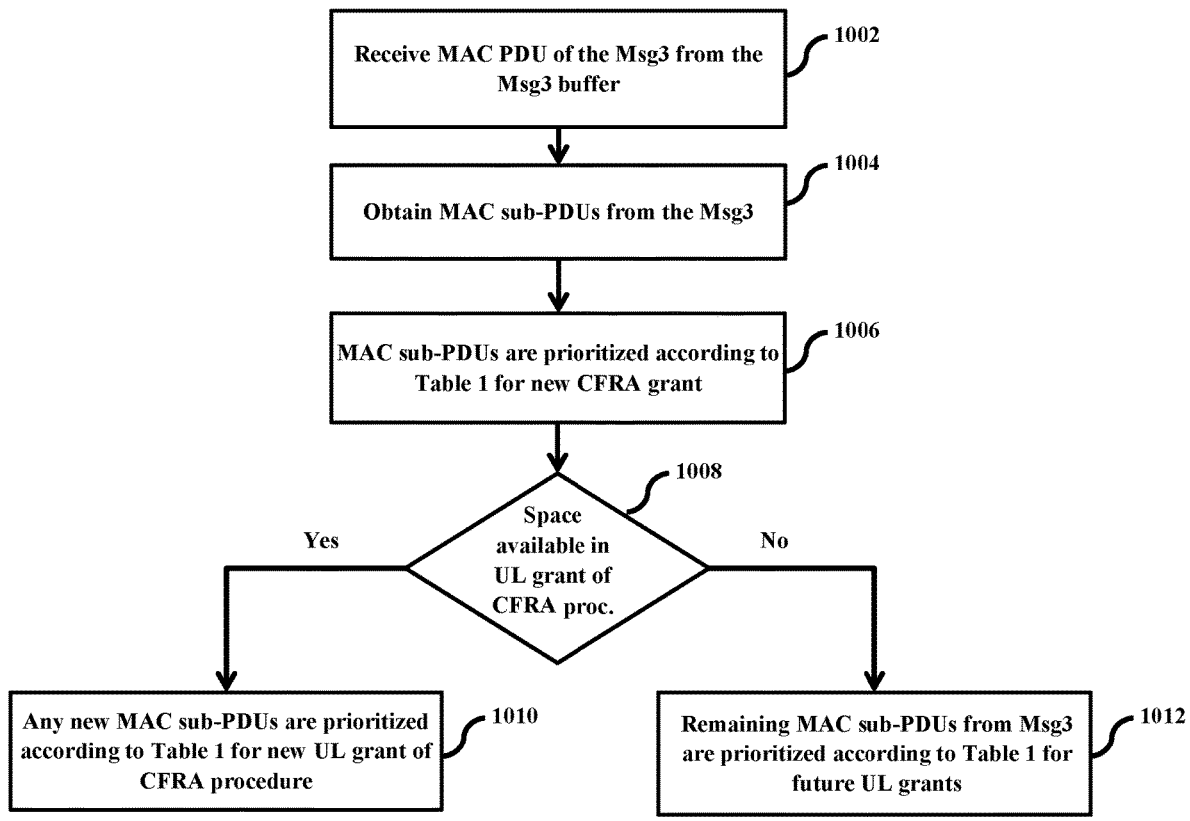
FIG. 10 is a flow chart illustrating a method for rebuilding the MAC PDU of the Msg3 based on a priority order of the plurality of MAC SDUs. Additionally.

FIG. 10 is a flow chart illustrating a method for rebuilding the MAC PDU of the Msg3 based on a priority order of the plurality of MAC SDUs. Additionally, FIG. 10 illustrates transmitting the rebuilt MAC PDU of the Msg3, according to an embodiment as disclosed herein.

In general, various entities such as a plurality of MAC CEs and channels have different priorities. When the UE receives the UL grant, the UE accommodates the various entities based on the priorities. Therefore, the plurality of MAC SDUs associated with the previous CBRA procedure are provided with the highest priority, while accommodating the new UL grant of the CFRA procedure. The channels are prioritized based on a prioritizing rule for the new CFRA grants provided in Table 1:

TABLE 1

| Entities/channels | Priority |
| --- | --- |
| Indicated MAC SDUs carrying the plurality of MAC SDU) from the obtained MAC PDU) of the MSG3 in the Msg3 buffer | 1 (highest priority) |
| C-RNTI MAC CE or data from uplink-common control channel (UL-CCCH) | 2 |
| Configured Grant Confirmation MAC CE | 3 |
| MAC CE for BSR, with exception of BSR included for padding | 4 |
| Single Entry PHR MAC CE or Multiple Entry PHR MAC CE | 5 |
| data from any Logical Channel, except data from UL-CCCH | 6 |
| MAC CE for Recommended bit rate query | 7 |
| MAC CE for BSR included for padding | 8 (lowest priority) |

Referring to FIG. 10, at step 1002, the UE receives the MAC PDU of the Msg3 from the existing Msg3 buffer, and at step 1004, the UE obtains the plurality of MAC SDUs from the MAC PDU of the Msg3. At step 1006, the UE prioritizes the plurality of MAC SDUs based on the prioritizing rule for the new CFRA grants described in the table 1.

Further, at step 1008, the UE determines whether space is available in the UL grant of the CFRA procedure.

In response to determining that space is available in the UL grant of the CFRA procedure, the UE rebuilds the MAC PDU of the Msg3 based on the priorities determined in step 1006 using the table 1.

In response to determining that the space is not available in the UL, grant of the CFRA procedure, the UE rebuilds the MAC PDU of the Msg3 by prioritizing the remaining MAC SDUs of the plurality of MAC SDUs based on the rule for CFRA grants in the next UL grant of the CFRA procedure.

Figure 11:
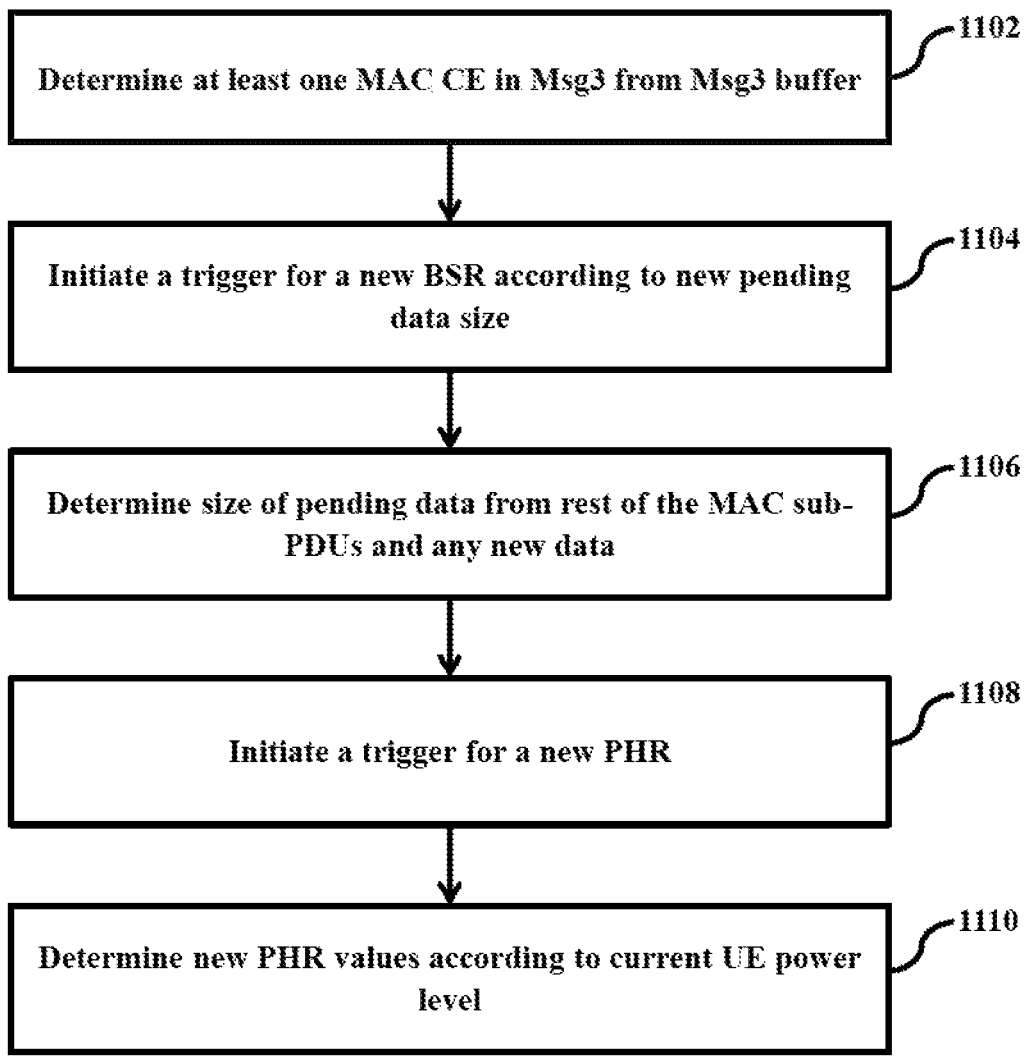
FIG. 11 is a flow chart illustrating a method for updating the at least one MAC CE in the Msg3 by initiating a trigger for MAC CE, according to an embodiment as disclosed herein.

FIG. 11 is a flow chart illustrating a method for updating the at least one MAC CE in the Msg3 by initiating a trigger for MAC CE, according to an embodiment as disclosed herein.

Referring to FIG. 11, at step 1102, the UE determines the at least one MAC CE in the Msg3 from the Msg3 buffer. The MAC CE may belong to data. However, the MAC CEs communicate signaling, such as power headroom status of the UE and buffer status of the UE. The UE may consider rebuilding the data PDUs of the Msg3 without considering the MAC CEs. Consider the MAC CE is the buffer status report control element (BSR CE). At step 1104, the UE initiates a trigger for a new BSR according to a new pending data size, which may regenerate the BSR contents of the Msg3, which may be added to the updated Msg3. At step 1106, the UE determines the size of the remaining MAC sub-PDUs of the plurality of MAC SDUs received in the MAC PDU of the Msg3 and any associated new data.

Further, consider the MAC CE is the power headroom reporting (PHR) media access control (MAC) control element (CE). At step 1108, the UE initiates a trigger for a new power headroom reporting (PHR), and at step 1110, the UE determines new PHR values based on the power level of the UE. Further, the UE rebuilds the MAC PDU of the Msg3 and accommodates the contents in the new UL grant of the CFRA procedure and transmits the rebuilt MAC PDU of the Msg3 in the UL grant.

Figure 12:
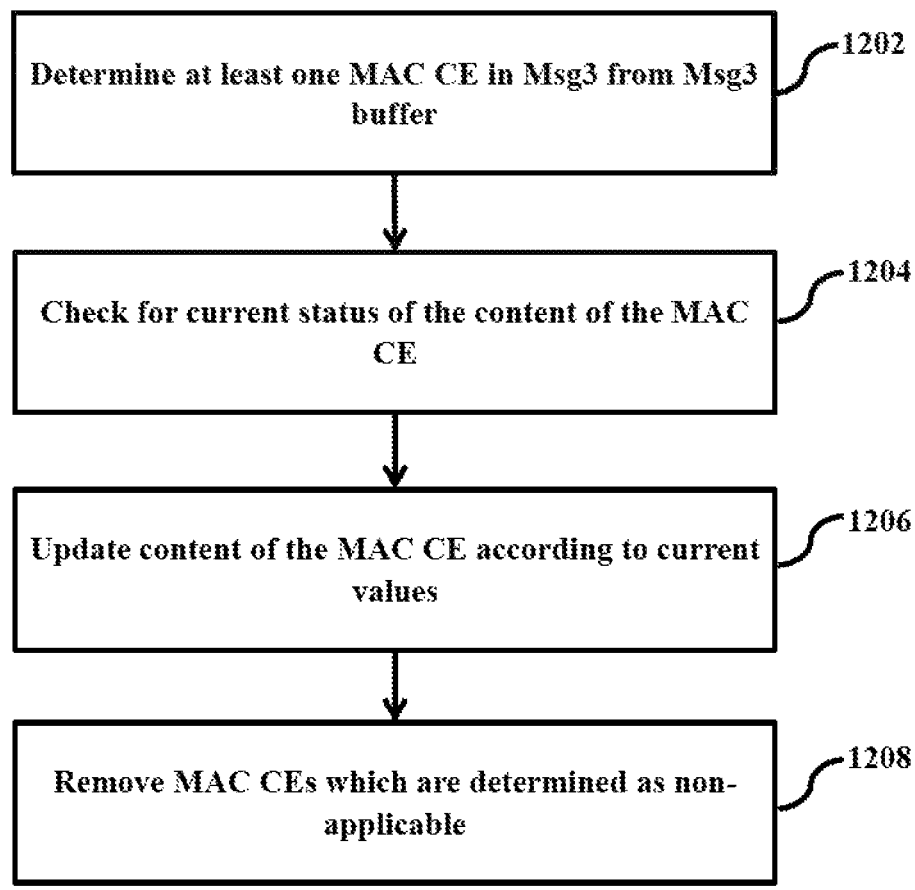
FIG. 12 is a flow chart illustrating a method for updating the at least one MAC CE in the Msg3 based on the status of the at least one MAC CE in the CFRA procedure, according to an embodiment as disclosed herein.

FIG. 12 is a flow chart illustrating a method for updating the at least one MAC CE in the Msg3 based on the status of the at least one MAC CE in the CFRA procedure, according to an embodiment as disclosed herein.

Referring to FIG. 12, at step 1202, the UE determines the at least one MAC CE in the Msg3 from the Msg3 buffer.

At step 1204, the UE determines a status of a content of the at least one MAC CE, such as applicability, staleness, format, size, etc, of the at least one MAC CE. The UE also determines the at least one MAC CE which is non-applicable based on the status of the content of the at least one MAC CE. Further, at step 1206, the UE updates the content of the at least one MAC CE based on the status of the at least one MAC CE such as a new format, new data size for the BSR, etc. At step 1208, the UE discards the at least one MAC CE such as the Cell Radio Network Temporary Identifier (CRNTI) MAC CE in case the CFRA procedure is operational.

In another embodiment, a method may follow the procedure explained in FIG. 11.

Figure 13:
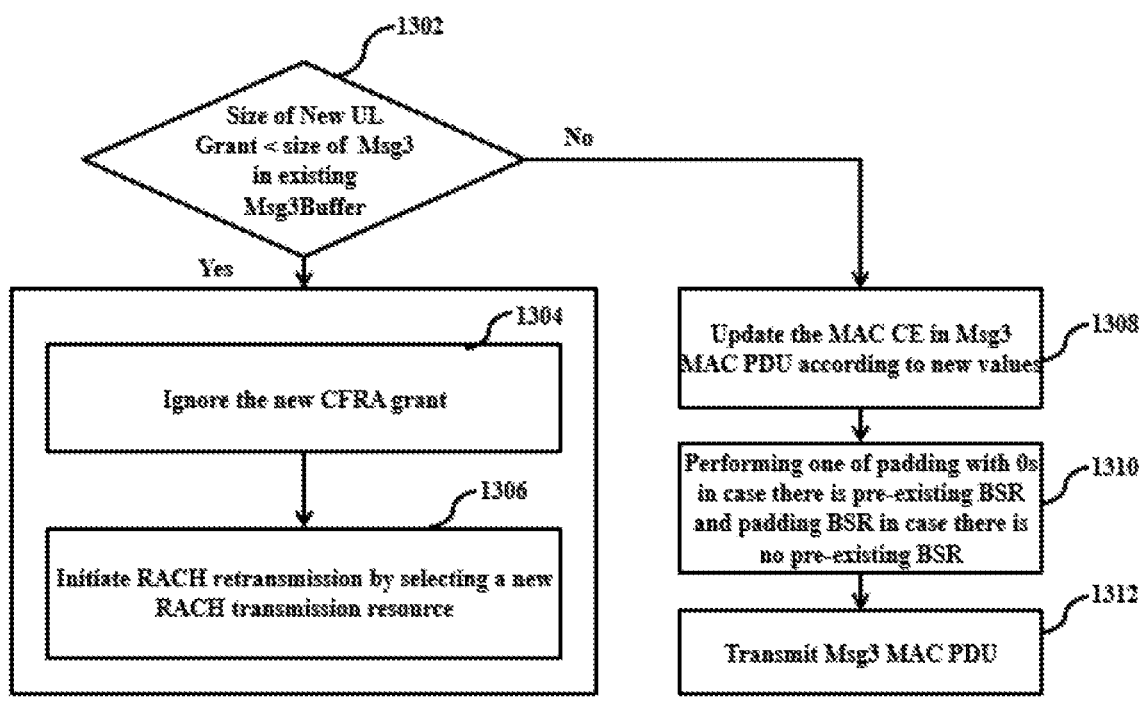
FIG. 13 is a flow chart illustrating a method for initiating a new RACH procedure after ignoring the UL grant associated with the CFRA operation, according to an embodiment as disclosed herein.

FIG. 13 is a flow chart illustrating a method for initiating the new RACH procedure after ignoring the UL grant associated with the CFRA operation, according to an embodiment as disclosed herein.

Referring to FIG. 13, at step 1302, the UE determines the size of the UL grant is less than the size of the MAC PDU of the Msg3 in the Msg3 buffer. The UE, at step 1308, updates the MAC CEs associated with the MAC SDUs based on the CFRA procedure, in response to determining that the size of the UL grant is not less than the size of the MAC PDU of the Msg3 in the Msg3 buffer. The existing MAC CEs contents may be associated with the MAC SDUs with respect to the previous CBRA procedure. Further, at step 1310, the UE performs either the padding with Os in case there is the pre-existing BSR or padding buffer status report (BSR) in case there is no pre-existing BSR in the UL grant received during the CFRA to fill in the extra space. At step 1312, the UE transmits the MAC PDU of the Msg3 with updated MAC SDUs based on the UL grant received during the CFRA procedure.

At step 1304, the UE may ignore and not pursue the UL grant received during the CFRA procedure, in response to determining that the size of the UL grant is less than the size of the MAC PDU of the Msg3 in the Msg3 buffer. Further, at step 1306, the UE initiates the RACH retransmission by selecting a new RACH transmission resource. During the selection of the new RACH transmission resource, the UE may continue to use the resources of the CFRA procedure. Additionally, since the UE is aware that the CFRA resources are not capable of accommodating the contents of the MAC PDU of the Msg3, the UE may switch to the CBRA procedure by selecting the CBRA resources.

Figure 14:
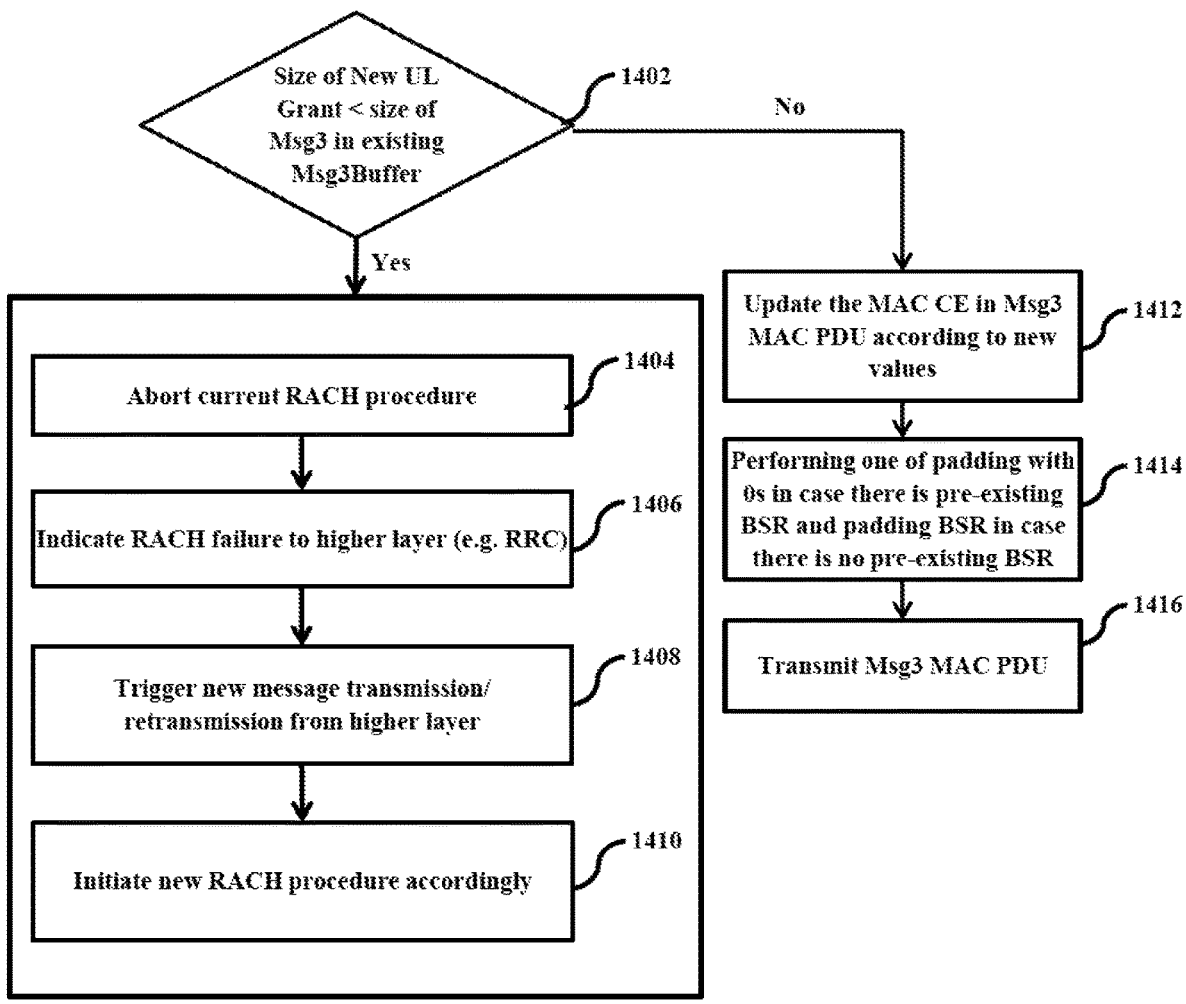
FIG. 14 is a flow chart illustrating a method for initiating the new RACH procedure after aborting an ongoing RACH procedure, according to an embodiment as disclosed herein.

FIG. 14 is a flow chart illustrating a method for initiating the new RACH procedure after aborting an ongoing RACH procedure, according to an embodiment as disclosed herein. Referring to FIG. 14 in conjunction with FIG. 13, steps 1302 and 1308 to 1312 may be substantially the same as steps 1402 and 1412 to 1416, and, thus repeated description is omitted.

At step 1404, the UE in response to determining that the size of the UL grant is less than the size of the Msg3 in the existing Msg3 buffer, the UE aborts the ongoing RACH procedure with the wireless communication network. Further, at step 1406, the UE indicates a RACH failure to an entity of a higher layer, such as the Radio Resource Control (RRC) layer.

At step 1408, the UE initiates a trigger to the RRC layer requesting for either the transmission of a new message or retransmission of the MAC CEs from a higher layer. Further, at step 1410, the UE determines that the RRC layer is initiated the new RACH procedure in response to the trigger received from the UE.

In another embodiment, a segmentation of the RRC message is possible in case the RRC message cannot be completely accommodated in the new UL grant.

The foregoing description of the specific embodiments will so fully reveal the general nature of One or more embodiments of the present disclosure that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while One or more embodiments of the present disclosure have been described in terms of preferred embodiments, those skilled in the art will recognize that One or more embodiments of the present disclosure can be practiced with modification within the spirit and scope of the embodiments as described herein.

What is claimed is:

1. A method for providing a lossless Random Access Channel (RACH) procedure in a wireless communication network, the method comprising:

determining, by a user equipment (UE), whether a size of an uplink (UL) grant is less than a size of a Medium Access Control (MAC) layer protocol data unit (PDU) of a Msg3 in a Msg3 buffer, wherein the Msg3 buffer comprises the MAC PDU and a plurality of MAC Sub PDUs (MAC SDUs) of the Msg3; and in response to determining that the size of the UL grant is less than the size of the MAC PDU of the Msg3 in the Msg3 buffer, performing by the UE, one of:

a) rebuilding the MAC PDU of the Msg3 using the MAC SDUs from the Msg3 buffer based on the UL grant, and transmitting a rebuilt MAC PDU of the Msg3, b) initiating a new RACH procedure, and c) updating at least one MAC Control Element (MAC CE) in the Msg3, wherein determining, by the UE, whether the size of the UL grant is less than the size of the MAC PDU of the Msg3 in the Msg3 buffer comprises:
  determining, by the UE, whether the size of the UL grant is equal to the size of the MAC PDU of the Msg3 in the Msg3 buffer during a transition from a contention-based random access (CBRA) operation to a contention-free random access (CFRA) operation in the wireless communication network, wherein the size of the MAC PDU of the Msg3 is formed during the CBRA operation and the UL grant is associated with the CFRA operation;
  accommodating, by the UE, the at least one MAC SDU formed during the CBRA operation in the MAC PDU of the Msg3; and
  determining, by the UE, whether the size of the UL grant is less than the size of the MAC PDU of the Msg3 in the Msg3 buffer after accommodating the at least one MAC SDU in the MAC PDU of the Msg3.

2. The method of claim 1, wherein the MAC PDU of the Msg3 formed during the CBRA operation comprises only an RRC message, wherein the RRC message is a signaling radio bearer (SRB) PDU.

3. The method of claim 1, wherein rebuilding the MAC PDU of the Msg3 using the MAC SDUs from the Msg3 buffer based on the UL grant comprises:
  receiving, by the UE, the MAC PDU of the Msg3 from the Msg3 buffer;
  rebuilding, by the UE, the MAC PDU of the Msg3 based on the size of the UL grant using the at least one MAC SDU of the plurality of MAC SDUs, wherein the at least one MAC SDU is selected based on a priority;
  updating, by the UE, the at least one MAC CE of the rebuilt MAC PDU of the Msg3 based on a UE condition; and
  storing, by the UE, remaining MAC SDUs of the plurality of MAC SDUs which are not accommodated in the UL grant for a future UL grant.

4. The method of claim 3, further comprising:
  transmitting, by the UE, the remaining MAC SDUs of the plurality of MAC SDUs based on the priority.

5. The method of claim 4, further comprising:
  determining, by an RLC layer entity, that an indication for a failure is provided for a Radio link control (RLC) layer status PDU; and
  triggering, by the RLC layer entity, a transmission of a new Radio link control (RLC) status PDU.

6. The method of claim 1, wherein rebuilding the MAC PDU of the Msg3 using the MAC SDUs from the Msg3 buffer based on the UL grant comprises:
  receiving, by the UE, the MAC PDU of the Msg3 from the Msg3 buffer;
  updating, by the UE, the at least one MAC CE based on a UE condition;
  rebuilding, by the UE, the MAC PDU of the Msg3 based on the size of the UL grant using the at least one MAC SDU of the plurality of MAC SDUs based on a priority; and
  indicating, by the UE, a failure of remaining MAC SDUs of the plurality of MAC SDUs which are not accommodated in the UL grant to a Radio link control (RLC) layer.

7. The method of claim 6, further comprising:
  receiving, by an RLC layer entity, an indication for the failure of the remaining MAC SDUs of the plurality of MAC SDUs which are not accommodated in the UL grant from the UE; and
  transmitting, by the RLC layer entity, the remaining MAC SDUs of the plurality of MAC SDUs for which the indication for the failure is received.

8. The method of claim 6, further comprising:
  receiving, by the UE, the remaining MAC SDUs of the plurality of MAC SDUs from the RLC layer entity; and
  transmitting, by the UE, the remaining MAC SDUs of the plurality of MAC SDUs in a future UL grant.

9. The method of claim 1, wherein rebuilding the MAC PDU of the Msg3 using the MAC SDUs from the Msg3 buffer based on the UL grant comprises:
  receiving, by the UE, the MAC PDU of the Msg3 from the Msg3 buffer;
  rebuilding, by the UE, the MAC PDU of the Msg3 based on the size of the UL grant using the at least one MAC SDUs of the plurality of MAC SDUs based on a priority; and
  indicating, by the UE, a failure to a Radio link control (RLC) layer for remaining MAC SDUs of the plurality of MAC SDUs which are not accommodated in the UL grant, wherein the failure to the RLC layer is an RLC NACK (non-acknowledgment) message.

10. The method of claim 9, further comprising:
  receiving, by an RLC layer entity, the RLC NACK message for the remaining MAC SDUs of the plurality of MAC SDUs which are not accommodated in the UL grant from the UE; and
  retransmitting, by the RLC layer entity, the remaining MAC SDUs of the plurality of MAC SDUs indicated in the RLC NACK.

11. The method of claim 10, further comprising:
  receiving, by the UE, the remaining MAC SDUs of the plurality of MAC SDUs from the RLC layer entity; and
  transmitting, by the UE, the remaining MAC SDUs of the plurality of MAC SDUs in a future UL grant.

12. The method of claim 9, further comprising:
  determining, by an RLC layer entity, that an indication for the failure is provided for a Radio link control (RLC) layer status PDU; and
  triggering, by the RLC layer entity, a transmission of a new Radio link control (RLC) status PDU.

13. The method of claim 1, wherein rebuilding the MAC PDU of the Msg3 using the MAC SDUs from the Msg3 buffer based on the UL grant comprises:
  receiving, by the UE, the MAC PDU of the Msg3 from the Msg3 buffer;
  updating, by the UE, the at least one MAC CE based on a UE condition;
  determining, by the UE, a priority order of the plurality of MAC SDUs;
  eliminating, by the UE, the at least one MAC SDU of the plurality of MAC SDUs with low priority until the size of the MAC PDU of the Msg3 matches the size of the UL grant associated with the CFRA operation; and
  rebuilding, by the UE, the MAC PDU of the Msg3 using remaining MAC SDUs of the plurality of MAC SDUs.

14. The method of claim 1, wherein rebuilding the MAC PDU of the Msg3 using the MAC SDUs from the Msg3 buffer based on the UL grant comprises:
  indicating, by the UE, a failure to a Radio Resource Control (RRC) for the at least one MAC SDU of the plurality of MAC SDUs corresponding to the RRC;
  receiving, by the UE, the at least one MAC SDU which are indicated as the failure by the UE, wherein a RRC layer entity retransmits the at least one MAC SDU which are indicated as the failure in a RRC message; and rebuilding, by the UE, the MAC PDU of the Msg3 based on the UL grant using the at least one MAC SDU of the plurality of MAC SDUs.

15. A user equipment (UE) for providing lossless Random Access Channel (RACH) procedure in a wireless communication network, the UE comprising:
a memory;
a processor coupled to the memory and configured to:
determine that a size of an uplink (UL) grant is less than a size of a Medium Access Control (MAC) layer protocol data unit (PDU) of a Msg3 in a Msg3 buffer, wherein the Msg3 buffer comprises the MAC PDU and a plurality of MAC Sub PDUs (MAC SDUs) of the Msg3;
in response to determining that the size of the UL grant is less than the size of the MAC PDU of the Msg3 in the Msg3 buffer, perform one of:
a) rebuild the MAC PDU of the Msg3 using the MAC SDUs from the Msg3 buffer based on the UL grant, and transmit a rebuilt MAC PDU of the Msg3,
b) initiate a new RACH procedure based on the determination, and
c) update at least one MAC Control Element (MAC CE) in the Msg3,
transmitting, by the UE, at least one MAC SDU of the plurality of MAC SDUs based on the UL grant;
storing, by the UE, remaining MAC SDUs of the plurality of MAC SDUs which are not accommodated in the UL grant for a future UL grant; and
transmitting, by the UE, the remaining MAC SDUs of the plurality of MAC SDUs based on the future UL grant.

16. A method of a wireless communication, the method comprising:
transmitting a Random Access Channel (RACH) preamble to a base station;
receiving a random access response (RAR) message in response to the RACH preamble, wherein the RAR message includes an uplink (UL) grant;
determining that a size of the UL grant is less than a size of a Medium Access Control (MAC) layer protocol data unit (PDU) in a Physical Uplink Shared Channel (PUSCH) buffer, wherein the PUSCH buffer comprises the MAC PDU and a plurality of MAC Sub PDUs (MAC SDUs);
initiating a new RACH procedure based on the determination;
receiving a new UL grant based on the new RACH procedure; and
transmitting a PUSCH message based on the new RACH procedure.

17. The method of claim 16, further comprising:
rebuilding the MAC PDU using the MAC SDUs based on the UL grant, wherein the PUSCH message comprises the rebuilt MAC PDU.

18. The method of claim 16, further comprising:
updating at least one MAC Control Element (MAC CE) based on the determination, wherein the PUSCH message is based on the updated MAC CE.

* * * * *